US011421485B1

(12) United States Patent
Linford et al.

(10) Patent No.: US 11,421,485 B1
(45) Date of Patent: *Aug. 23, 2022

(54) POLYCRYSTALLINE DIAMOND COMPACTS AND APPLICATIONS THEREFOR

(71) Applicant: US Synthetic Corporation, Orem, UT (US)

(72) Inventors: Brandon Paul Linford, Draper, UT (US); Cody William Knuteson, Salem, UT (US); Jason Dean Blackburn, Orem, UT (US); Daniel Call Mortensen, Provo, UT (US); Steven Swan, North Salt Lake, UT (US)

(73) Assignee: US Synthetic Corporation, Orem, UT (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/708,411

(22) Filed: Dec. 9, 2019

Related U.S. Application Data

(60) Division of application No. 14/627,966, filed on Feb. 20, 2015, now Pat. No. 10,501,998, which is a continuation-in-part of application No. 13/734,354, filed on Jan. 4, 2013, now Pat. No. 9,346,149.

(60) Provisional application No. 62/002,001, filed on May 22, 2014, provisional application No. 61/948,970, filed on Mar. 6, 2014.

(51) Int. Cl.
*E21B 10/55* (2006.01)
*B01J 3/06* (2006.01)
*E21B 10/567* (2006.01)
*B23B 27/20* (2006.01)
*B24D 99/00* (2010.01)
*B24D 18/00* (2006.01)

(52) U.S. Cl.
CPC ............... *E21B 10/55* (2013.01); *B01J 3/06* (2013.01); *B01J 3/062* (2013.01); *B24D 18/0009* (2013.01); *B24D 99/005* (2013.01); *E21B 10/567* (2013.01); *B01J 2203/062* (2013.01); *B01J 2203/0655* (2013.01); *B23B 27/20* (2013.01)

(58) Field of Classification Search
CPC .......... E21B 10/55; E21B 10/46; B23B 27/20
See application file for complete search history.

(56) References Cited

U.S. PATENT DOCUMENTS

| 5,584,045 | A | 12/1996 | Tanabe et al. |
| 6,338,754 | B1 | 1/2002 | Cannon et al. |
| 7,866,418 | B2 | 1/2011 | Bertagnolli et al. |
| 8,071,173 | B1 | 12/2011 | Sani |
| 8,236,074 | B1 | 8/2012 | Bertagnolli et al. |
| 8,663,349 | B2 | 3/2014 | Sani et al. |
| 8,864,858 | B1 | 10/2014 | Kidd et al. |
| 9,346,149 | B1 | 5/2016 | Linford et al. |
| 2004/0062928 | A1* | 4/2004 | Raghavan ............ B24D 99/005 428/408 |
| 2004/0238227 | A1 | 12/2004 | Smith et al. |
| 2006/0266559 | A1 | 11/2006 | Keshavan et al. |
| 2010/0239483 | A1 | 9/2010 | Middlemiss |
| 2010/0300764 | A1* | 12/2010 | Naidoo ................ E21B 10/567 175/426 |
| 2011/0226532 | A1 | 9/2011 | Jonker et al. |
| 2011/0259648 | A1 | 10/2011 | Sani |
| 2012/0152622 | A1 | 6/2012 | Sue |
| 2013/0092451 | A1* | 4/2013 | Mukhopadhyay ........ C23F 1/02 175/428 |
| 2013/0180181 | A1* | 7/2013 | Nixon ..................... B24D 3/04 51/309 |

OTHER PUBLICATIONS

Kenneth E. Bertagnolli et al.; Methods for Characterizing a Polycrystalline Diamond Element by Porosimetry; U.S. Appl. No. 61/846,138, filed Jul. 15, 2013.

Cody William Knuteson et al.; Polycrystalline Diamond Compacts and Applications Therefor; U.S. Appl. No. 61/948,970, filed Mar. 6, 2014.

Cody William Knuteson et al.; Polycrystalline Diamond Compacts and Applications Therefor; U.S. Appl. No. 62/002,001, filed May 22, 2014.

Daren Nathaniel Heaton et al.; Leached Superabrasive Elements and Systems, Methods and Assemblies for Processing Superabrasive Materials; U.S. Appl. No. 62/062,553, filed Oct. 10, 2014.

Heaton et al.; U.S. Appl. No. 62/096,315, filed Dec. 23, 2014.

Kenneth E. Bertagnolli et al.; Methods for Characterizing a Polycrystalline Diamond Element by Porosimetry; U.S. Appl. No. 14/329,552, filed Jul. 11, 2014.

(Continued)

*Primary Examiner* — Pegah Parvini
(74) *Attorney, Agent, or Firm* — Phillips Winchester

(57) ABSTRACT

Embodiments relate to polycrystalline diamond compacts ("PDCs") including a polycrystalline diamond ("PCD") table having a diamond grain size distribution selected for improving performance and/or leachability. In an embodiment, a PDC includes a PCD table bonded to a substrate. The PCD table includes a plurality of diamond grains exhibiting diamond-to-diamond bonding therebetween. The plurality of diamond grains includes a first amount being about 5 weight % to about 65 weight % of the plurality of diamond grains and a second amount being about 18 weight % to about 95 weight % of the plurality of diamond grains. The first amount exhibits a first average grain size of about 0.5 µm to about 30 µm. The second amount exhibits a second average grain size that is greater than the first average grain size and is about 10 µm to about 65 µm. Other embodiments are directed to methods of forming PDCs, and various applications for such PDCs in rotary drill bits, bearing apparatuses, and wire-drawing dies.

20 Claims, 17 Drawing Sheets

(56) References Cited

OTHER PUBLICATIONS

ASTM B886-03 (2008) "Standard Test Method for Determination of Magnetic Saturation (Ms) of Cemented Carbides".
ASTM B887-03 (2008) "Standard Test Method for Determination of Coercivity (Hcs) of Cemented Carbides".
G. Rousse, S. Klotz, A. M. Saitta, J. Rodriguez-Carvajal, M. I. McMahon, B. Couzinet, and M. Mezouar; "Structure of the Intermediate Phase of PbTe at High Pressure," Physical Review B: Condensed Matter and Materials Physics, 71, 224116 (2005).
D. L. Decker, W. A. Bassett, L. Merrill, H. T. Hall, and J. D. Barnett; "High-Pressure Calibration: A Critical Review," J. Phys. Chem. Ref. Data, 1, 3 (1972).

\* cited by examiner

POLYCRYSTALLINE DIAMOND COMPACTS AND APPLICATIONS THEREFOR

CROSS-REFERENCE TO RELATED APPLICATIONS

This application is a divisional of U.S. application Ser. No. 14/627,966 filed on Feb. 20, 2015, which is hereby incorporated by reference in its entirety. U.S. application Ser. No. 14/627,966 is a continuation-in-part of U.S. application Ser. No. 13/734,354 filed on Jan. 4, 2013 and also claims priority to U.S. Provisional Patent Application No. 61/948,970 filed on Mar. 6, 2014 and U.S. Provisional Patent Application No. 62/002,001 filed on May 22, 2014, each of which is hereby incorporated by reference in its entirety.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer commonly referred to as a diamond table. The diamond table may be formed and bonded to a substrate using a high-pressure, high-temperature ("HPHT") process. The PDC cutting element may also be brazed directly into a preformed pocket, socket, or other receptacle formed in the bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned adjacent to the cemented carbide substrate. A number of such containers may be loaded into an HPHT press. The substrate and volume of diamond particles are then processed under HPHT conditions in the presence of a catalyst that causes the diamond particles to bond to one another to form a matrix of bonded diamond grains defining a polycrystalline diamond ("PCD") table that is bonded to the substrate. The catalyst is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of bonded diamond grains.

Despite the availability of a number of different PCD materials, manufacturers and users of PCD materials continue to seek improved PCD materials.

SUMMARY

Embodiments of the invention relate to a PDC including a PCD table having a diamond grain size distribution selected for enhanced performance and/or leachability. In an embodiment, a PDC includes a PCD table bonded to a substrate. The PCD table includes a plurality of diamond grains exhibiting diamond-to-diamond bonding therebetween. The plurality of diamond grains includes a first amount being about 5 weight % to about 65 weight % of the plurality of diamond grains and a second amount being about 18 weight % to about 95 weight % of the plurality of diamond grains. The first amount of the plurality of diamond grains exhibits a first average grain size of about 0.5 μm to about 30 μm. The second amount of the plurality of diamond grains exhibits a second average grain size that is greater than the first average grain size and is about 10 μm to about 65 μm.

In an embodiment of the PDC, the first amount is about 25 weight % to about 40 weight %, the second amount is about 55 weight % to about 80 weight %, the first average grain size is about 1 μm to about 14 μm, and the second average grain size is about 16 μm to about 30 μm.

In an embodiment of the PDC, the first amount is about 35 weight % to about 45 weight %, the second amount is about 55 weight % to about 65 weight %, the first average grain size is about 10 μm to about 14 μm, and the second average grain size is about 18 urn to about 22 urn.

In an embodiment of the PDC, the first amount is about 40 weight %, the second amount is about 60 weight %, the first average grain size is about 12 μm, and the second average grain size is about 20 μm.

In an embodiment of the PDC, the first amount is about 20 weight % to about 30 weight %, the second amount is about 70 weight % to about 80 weight %, the first average grain size is about 0.5 μm to about 5 μm, and the second average grain size is about 15 μm to about 20 μm.

In an embodiment of the PDC, the first amount is about 25 weight %, the second amount is about 75 weight %, the first average grain size is about 2 μm, and the second average grain size is about 16 μm.

In an embodiment of the PDC, the first amount is about 40 weight %, the second amount is about 60 weight %, the first average grain size is about 2 μm, and the second average grain size is about 30 μm.

In an embodiment of the PDC, the plurality of diamond grains further includes a third amount being about 5 weight % to about 35 weight % of the plurality of diamond grains, with the third average grain size being larger than the first and second average grain sizes such as the third average grain size being about 27 μm to about 33 μm.

In an embodiment of the PDC, the first amount is about 20 weight % to about 30 weight %, the second amount is about 55 weight % to about 65 weight %, the first average grain size is about 1 μm to about 3 μm, the second average grain size is about 14 urn to about 18 urn, and the third average grain size is about 27 urn to about 33 urn.

In an embodiment of the PDC, the first amount is about 26 weight %, the second amount is about 59 weight %, the third amount is about 15 weight %, the first average grain size is about 2 μm, the second average grain size is about 16 μm, and the third average grain size is about 30 μm.

In an embodiment of the PDC, the PCD table includes an additive in a range from greater than 0 weight % to about 5 weight % of the polycrystalline diamond table. For example, the additive may include boron and the range is from greater than 0 weight % to about 0.5 weight % of the PCD table.

In an embodiment, a method of fabricating a PDC includes mixing a plurality of diamond particles. The plurality of diamond particles includes a first amount being about 5 weight % to about 65 weight % of the plurality of diamond particles that exhibits a first average particle size of about 0.5 μm to about 30 μm and a second amount being about 18 weight % to about 95 weight % of the plurality of diamond particles that exhibits a second average particle size greater than the first average particle size and about 10 μm to about 65 μm. The method includes enclosing a plurality of diamond particles in a pressure transmitting medium to form a cell assembly. The method further includes subjecting the cell assembly to a high-pressure/high-temperature process to form a PCD body.

In an embodiment of the method, the first amount is about 15 weight % to about 45 weight % and the second amount is about 55 weight % to about 80 weight %.

In an embodiment of the method, the first average particle size is about 1 μm to about 3 μm and the second average particle size is about 14 μm to about 18 μm.

In an embodiment of the method, the first amount is about 38 weight % to about 42 weight %, the first average particle size is about 12 μm, the second amount is about 58 weight % to about 62 weight %, and the second average particle size is about 20 μm.

In an embodiment of the method, the first amount is about 20 weight % to about 45 weight %, the second amount is about 55 weight % to about 80 weight %, the first average particle size is about 0.5 μm to about 5 μm, and the second average particle size is about 14 μm to about 18 μm.

In an embodiment of the method, the second amount is about 70 weight % to about 80 weight %, the first average particle size is about 1 μm to about 3 μm, and the second average particle size is about 14 μm to about 18 μm.

In an embodiment of the method, the first amount is about 25 weight % and the second amount is about 75 weight %, and the first average particle size is about 2 μm, and the second average particle size is about 16 μm.

In an embodiment of the method, the first amount is about 35 weight % to about 45 weight %, second amount is about 55 weight % to about 65 weight %, the first average particle size is about 1 μm to about 3 μm, and the second average particle size is about 30 μm to about 32 μm.

In an embodiment of the method, the first amount is about 26 weight %, the second amount is about 59 weight %, the first average particle size is about 2 μm, and the second average particle size is about 16 μm.

In an embodiment of the method, the plurality of diamond particles further includes a third amount of about 10 weight % to about 20 weight % of the plurality of diamond particles which exhibits a greater average diamond particle size than the first amount and the second amount, and the third average diamond particle size is about 20 μm to about 45 μm. For example, the third amount may be about 15 weight % of the plurality of diamond particles, and the third average diamond particle size may be about 30 μm.

In an embodiment of the method, the method further includes mixing boron with the plurality of diamond particles in an amount greater than 0 weight % to about 5 weight %.

In an embodiment of the method, the cell assembly includes a substrate positioned at least proximate to the plurality of diamond particles, and wherein subjecting the cell assembly to an HPHT process to form a PCD body includes forming the PCD body as a table bonded to the substrate.

Further embodiments relate to applications utilizing the disclosed PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION OF EXEMPLARY EMBODIMENTS

Figure 1A:
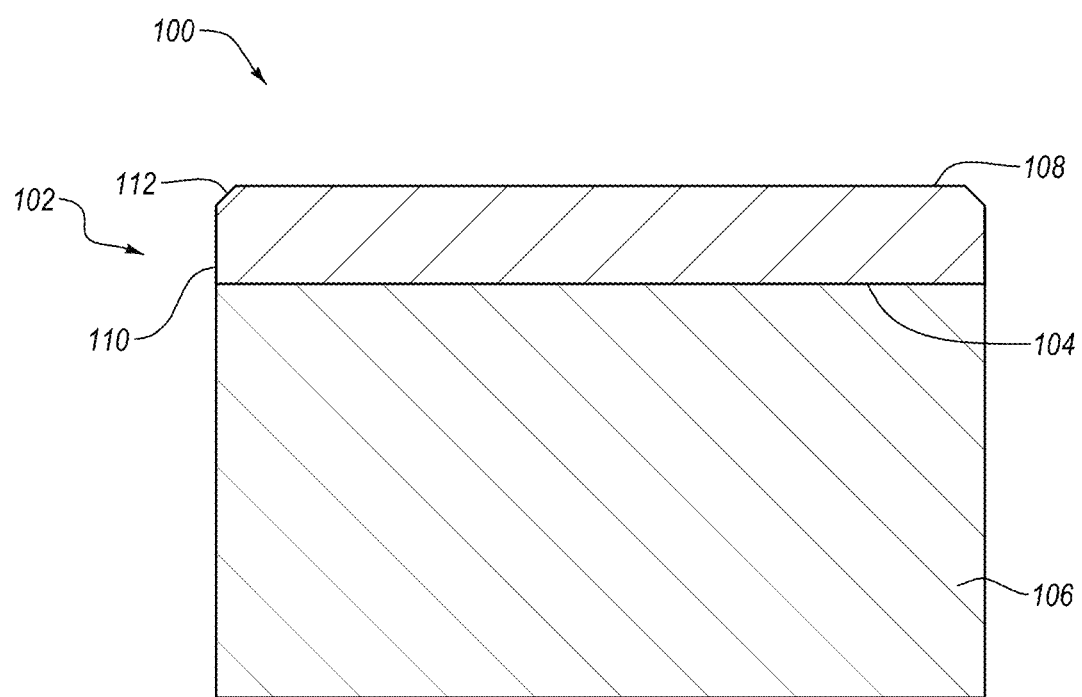
FIG. 1A a cross-sectional view of a PDC according to an embodiment.
Figure 1B:
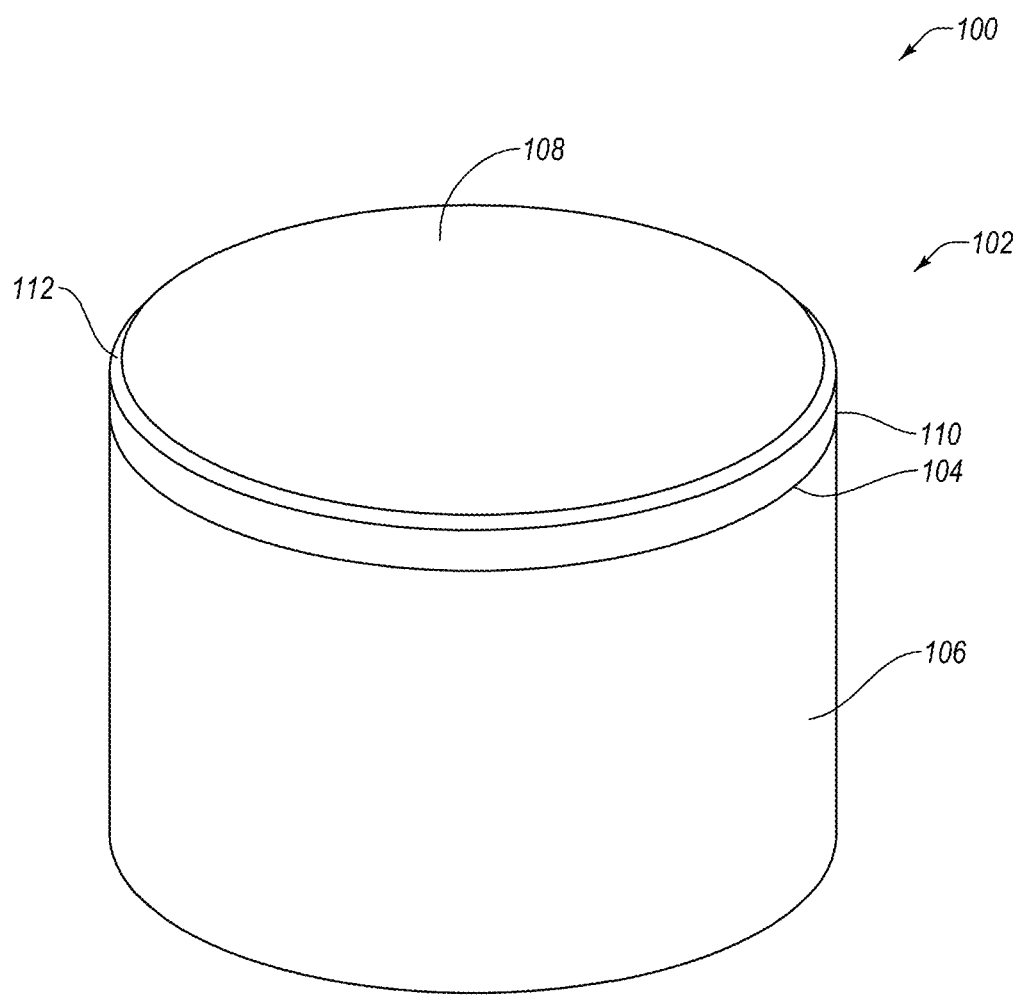
FIG. 1B is an isometric view of the PDC shown in FIG. 1A.

Embodiments of the invention relate to a PDC including a PCD table having a diamond grain size distribution selected for enhanced performance and/or leachability, methods of fabricating such PDCs, and applications for such PDCs in rotary drill bits, bearing apparatuses, wire-drawing dies, machining equipment, and other articles and apparatuses. FIGS. 1A and 1B are cross-sectional and isometric views, respectively, of a PDC 100 according to an embodiment. The PDC 100 includes a PCD table 102 bonded to an interfacial surface 104 of a substrate 106. The PCD table 102 includes an upper surface 108, at least one lateral surface 110, and an optional chamfer 112 extending therebetween. One or more of the upper surface 108, at least one lateral surface 110, or chamfer 112 may function as a working/cutting or bearing surface during use. In an embodiment, the PCD table 102 may be integrally formed with the substrate 106, while in other embodiments; the PCD table 102 may be preformed and bonded to the substrate 106. Although FIGS. 1A and 1B show the upper surface 108 and the interfacial surface 104 as being substantially planar, the upper surface 108 and/or the interfacial surface 104 may be concave, convex, grooved, dimpled, textured, or another selected non-planar geometry.

The substrate 106 may be generally cylindrical or another selected configuration, without limitation. The substrate 106 may also include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 106 comprises cobalt-cemented tungsten carbide.

The PCD table 102 includes a plurality of diamond grains (e.g., sintered diamond particles) directly bonded together via diamond-to-diamond bonding (e.g., sp3 bonding) that defines a plurality of interstitial regions. At least a portion of the interstitial regions or, in some embodiments, substantially all of the interstitial regions may be occupied by a metal-solvent catalyst and/or metallic infiltrant, such as iron, nickel, cobalt, or alloys of any of the foregoing metals.

The plurality of diamond grains of the PCD table 102 may exhibit a selected bimodal, tri-modal, or greater grain size distribution that improves leachability and/or PDC performance (e.g., one or more of wear resistance, thermal stability, impact resistance, etc.). It is currently believed by the inventors that the interstitial regions of the PCD table 102 may be relatively more interconnected due to the selected diamond grain size distribution, which enables relatively faster and/or more complete leaching of the metal-solvent catalyst and/or metallic infiltrant from the PCD table 102. Further, the selected grain size distribution and more complete leaching may enable better performance (e.g., improved wear resistance and/or thermal stability) of the resulting at least partially leached PCD table 102. In an embodiment, the plurality of diamond grains may include a first amount or portion that is about 5 volume % to about 65 volume % of the plurality of diamond grains, a second amount or portion that is about 18 volume % to about 95 volume % of the plurality of diamond grains, and, when present, a third amount or portion that is about 5 volume % to about 35 volume % of the plurality of diamond grains. The first amount may exhibit a first average grain size of about 0.5 µm to about 30 µm, the second amount may exhibit a second average grain size that is greater than the first average grain size and about 10 µm to about 65 µm, and, when present, the third amount may exhibit a third average grain size greater than the first average grain size and the second average grain size. For example, the third average grain size may be about 20 µm to about 45 µm.

In an embodiment, the plurality of diamond grains may include a first amount or portion that is about 15 volume % to about 45 volume % of the plurality of diamond grains, a second amount or portion that is about 50 to about 80 volume % of the plurality of diamond grains, and, when present, a third amount or portion that is about 10 volume % to about 20 volume % of the plurality of diamond grains. The first amount may exhibit a first average grain size of about 1 µm to about 14 µm, the second amount may exhibit a second average grain size that is greater than the first average grain size and about 15 µm to about 24 µm, and, when present, the third amount may exhibit a third average grain size greater than the first average grain size and the second average grain size. The third average grain size may be about 25 µm to about 40 µm.

In an embodiment, the plurality of diamond grains may include a first amount that is about 35 volume % to about to about 45 volume % (e.g., about 40 volume %) of the plurality of diamond grains and a second amount that is about 55 to about 65 volume % (e.g., about 60 volume %) of the plurality of diamond grains. The first amount may exhibit a first average grain size of about 10 µm to about 14 µm (e.g., about 12 µm), and the second amount may exhibit a second average grain size that is greater than the first average grain size and about 18 µm to about 22 µm (e.g., about 20 µm), and, when present, the third amount may exhibit a third average grain size greater than the first average grain size and the second average grain size. The third average grain size may be about 25 µm or more (e.g., about 25 µm to about 35 µm, or about 30 µm). In an embodiment, the plurality of diamond grains may include a first amount that is about 20 volume % to about to about 30 volume % (e.g., about 25 volume %) of the plurality of diamond grains and a second amount that is about 70 volume % to about 80 volume % (e.g., about 75 volume %) of the plurality of diamond grains. The first amount may exhibit a first average grain size of about 0.5 µm to about 5 µm (e.g., about 2 µm), the second amount may exhibit a second average grain size that is greater than the first average grain size and about 15 µm to about 20 µm (e.g., about 16 µm). In an embodiment, the plurality of diamond grains may include a first amount that is about 20 volume % to about to about 30 volume % (e.g., about 25 volume %) of the plurality of diamond grains and a second amount that is about 55 volume % to about 65 volume % (e.g., about 59 volume %) of the plurality of diamond grains, and, when present, a third amount that is about 10 volume % to about 20 volume % (e.g., about 15 volume %). The first amount may exhibit a first average grain size of about 0.5 µm to about 5 µm (e.g., about 2 µm), the second amount may exhibit a second average grain size that is greater than the first average grain size and about 14 µm to about 18 µm (e.g., about 16 µm), and, when present, the third amount may exhibit a third average grain size greater than the first average grain size and the second average grain size. The third average grain size may be about 25 µm or more (e.g., about 27 µm to about 33 µm, or about 30 µm).

As used herein, "first amount," "second amount," "first average grain size," "second average grain size," "first average particle size," "second average particle size," etc. does not specifically refer to the order of diamond particles placed in a diamond particle mixture. Rather, the terms "first," "second," "third," etc., are merely used to associate a specific amount or range of amounts to a corresponding grain or particle size or range of grains or particles sizes. For example, the "first amount" and corresponding "first average grain size" may be referred to as the "second amount" and "second average grains size" so long as the amounts and associated particle sizes recited herein are correspondingly named.

Typically, leachability generally increases as the volume % of the relatively larger sized second amount of diamond grains increases, while wear resistance generally increases as the volume % of the relatively smaller sized first amount of diamond grains increases. The "volume %" of a plurality of diamond grains or particles is substantially equal to the "weight %" of the plurality of diamond grains or particles, due to the identical density of the individual portions of diamond particles and/or diamond grains (as opposed to the weight % of a PCD table having a non-diamond constituent therein). Notwithstanding small variations in size due to diamond-to-diamond bonding and crushing forces applied to the diamond particles during sintering, the average diamond grain size is substantially equal to the average diamond particle size. Thus, the amounts, grain sizes, particles sizes, and ranges thereof disclosed herein, may apply to diamond grains and/or diamond particles alike.

In an embodiment, the PCD table 102 may also include at least one additive selected for accelerating leaching of the metal-solvent catalyst and/or metallic infiltrant from the PCD table 102. For example, the at least one additive may include boron grains, boron carbide grains, grains made of refractory metals (e.g., niobium, molybdenum, tantalum, tungsten, rhenium, hafnium, or alloys thereof), or combinations thereof. The amount of the at least one additive present in the PCD table 102 may be greater than 0 weight % to about 5 weight % of the PCD table 102, such as greater than 0 weight % to about 0.5 weight %, about 0.05 weight % to about 0.1 weight %, or about 1 weight % to about 3 weight % of the PCD table 102, with the balance substantially being diamond grains and the metal-solvent catalyst and/or metallic infiltrant. Some embodiments of suitable additives can be found in U.S. Pat. No. 8,663,349, the disclosure of which is incorporated herein, in its entirety, by this reference.

In one or more embodiments, the Gratio of the PCD table 102 of the PDC 100 may be about $1 \times 10^7$ to about $5 \times 10^7$, such as about $1.5 \times 10^7$ to about $4 \times 10^7$, about $2 \times 10^7$ to about $4.0 \times 10^7$, about $2.5 \times 10^7$ to about $3.5 \times 10^7$. The Gratio may be evaluated using a vertical turret lathe ("VTL") test by measuring the volume of the PDC 100 removed versus the volume of Barre granite workpiece removed, while the workpiece is cooled with water. The test parameters may include a depth of cut for the PDC 100 of about 0.254 mm, a back rake angle for the PDC 100 of about 20 degrees, an in-feed for the PDC 100 of about 6.35 mm/rev, and a rotary speed of the workpiece to be cut of about 101 RPM. Gratio is the ratio of the volume of the workpiece removed to the volume of the PDC 100 removed.

Figure 2:
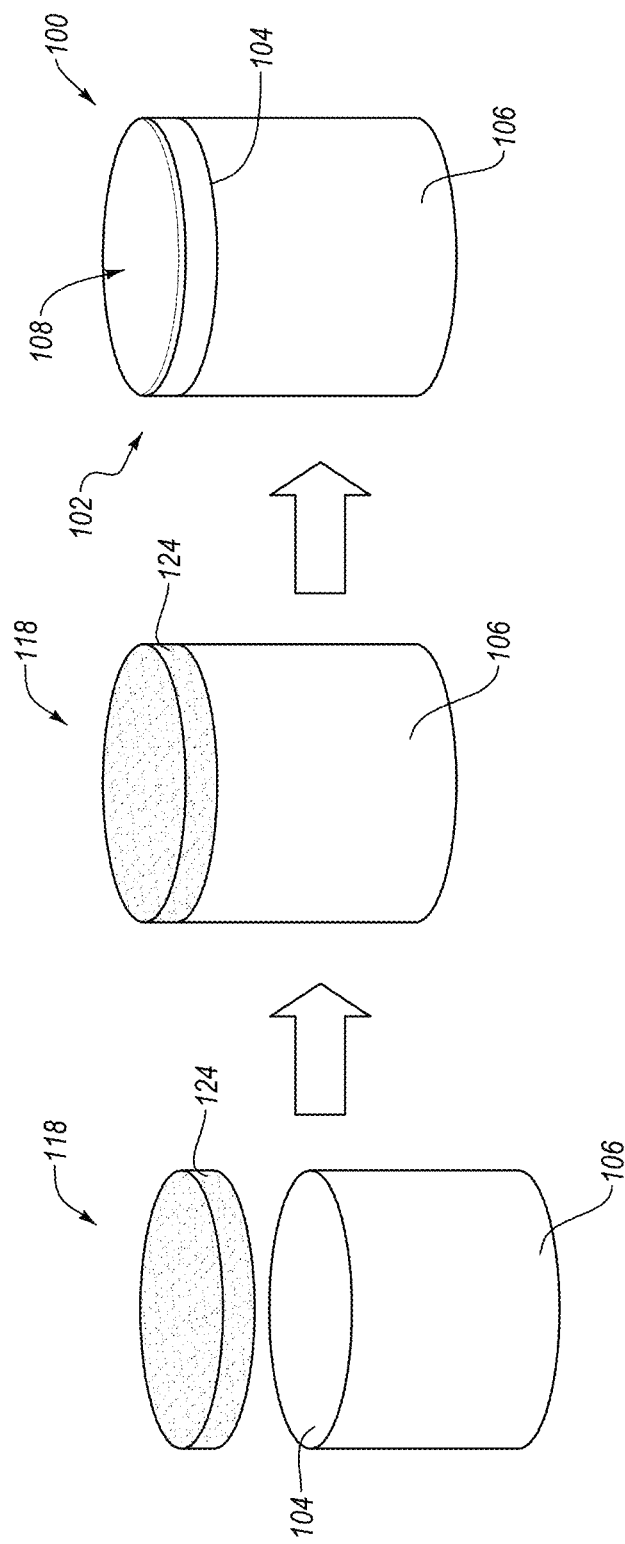
FIG. 2 is a schematic illustration of a method of fabricating the PDC shown in FIGS. 1A and 1B according to an embodiment.

FIG. 2 is a schematic illustration of a method for fabricating the PDC 100 shown in FIGS. 1A and 1B. FIG. 2 illustrates a PDC precursor assembly 118 including one or more layers 124 including a plurality of diamond particles. The plurality of diamond particles may exhibit a bimodal, tri-modal, or greater particle sizes and distributions that are substantially the same or similar to that of the diamond grain sizes and distributions described above for the PCD table 102. The plurality of diamond particles may exhibit two, three, or more distinct particle size modes. The desired particles, including the desired particle size distributions may be mixed together from separate diamond particle batches, each exhibiting a single mode, to form a collective multi-modal mixture as described herein.

In an embodiment, the plurality of diamond particles may include a first amount that is about 30 weight % to about 65 weight % of the plurality of diamond particles, a second amount that is about 18 to about 65 weight % of the plurality of diamond particles, and, when present, a third amount that is about 0 weight % to about 40 weight %. The first amount may exhibit a first average particle size of about 8 μm to about 14 μm, the second amount may exhibit a second average particle size that is greater than the first average particle size and about 15 μm to about 50 μm, and, when present, the third amount may exhibit a third average particle size greater than the first average particle size the second average particle size and about 25 μm or greater (e.g., about 30 μm to about 80 μm). In embodiment, the first amount may be about 35 weight % to about 45 weight % of the plurality of diamond particles (e.g., about 38 weight % to about 40 weight %, about 38 weight % to about 42 weight %, or about 40 weight %) and the second amount may be about 55 weight % to about 65 weight % of the plurality of diamond particles (e.g., about 58 weight % to about 62 weight %, or about 60 weight %). In an embodiment, the first amount may be about 40 weight % to about 60 weight % of the plurality of diamond particles (e.g., about 40 weight % to about 45 weight %, about 55 weight % to about 60 weight %, or about 45 weight % to about 55 weight %) and the second amount may be about 20 weight % to about 50 weight % of the plurality of diamond particles (e.g., about 20 weight % to about 30 weight %, about 20 weight % to about 40 weight %, or about 45 weight % to about 55 weight %). In other embodiments, the second amount may be about 35 weight % to about 45 weight % of the plurality of diamond particles (e.g., about 38 weight % to about 40 weight %, about 38 weight % to about 42 weight %, or about 40 weight %) and the first amount may be about 55 weight % to about 65 weight % of the plurality of diamond particles (e.g., about 58 weight % to about 62 weight %, or about 60 weight %).

In an embodiment, any combination of the following first and second average particle sizes may be combined with any of the disclosed first and second amounts. The first average particle size may be about 10 μm to about 22 μm (e.g., about 8 μm to about 14 μm, about 10 μm to about 12 μm, about 10 μm to about 14 μm, about 15 μm to about 25 μm, about 11 μm to about 12 μm, or about 12 μm) and the second average particle size may be larger than the first average particle size and about 18 μm to about 50 μm (e.g., about 18 μm to about 22 μm, about 19 μm to about 21 μm, about 20 μm, about 20 μm to about 45 μm, about 20 μm to about 40 μm, or about 25 μm to about 35 μm).

In another more detailed embodiment, the first amount is about 40 weight % to about 50 weight % of the plurality of diamond particles (e.g., about 45 weight %) with a first average particle size of about 10 μm to about 14 μm (e.g., about 12 μm), the second amount is about 30 weight % to about 36 weight % of the plurality of diamond particles (e.g., about 34 weight %) with a second average particle size of about 18 μm to about 22 μm (e.g., about 20 μm), and the third amount is about 30 weight % to about 35 weight % of the plurality of diamond particles (e.g., about 34 weight %) with a third average particle size of about 18 μm to about 22 μm (e.g., about 20 μm). Stated another way, a ratio of the first average particle size to the second average particle size may be about 1:1.06 to about 1:13.5, such as about 4:9 to about 11:25, about 5:11 to about 3:5, or about 3:5. Generally, the leachability of the PCD table 102 so formed increases as the weight % of the relatively larger sized second amount of diamond particles increases, while generally the wear resistance of the PCD table 102 increases as the weight % of the relatively smaller sized first amount of diamond particles increases.

In an embodiment, the plurality of diamond particles may include a first amount or portion that is about 5 weight % to about 50 weight % of the plurality of diamond particles, a second amount or portion that is about 50 weight % to about 95 weight % of the plurality of diamond particles, and, when present, a third amount or portion that is greater than about 0 weight % to about 45 weight %. The first amount may exhibit a first average particle size of about 0.5 μm to about 30 μm, the second amount may exhibit a second average particle size that is greater than the first average particle size and about 10 μm to about 65 μm, and, when present, the third amount may exhibit a third average particle size greater than the first and second average particle sizes. In an embodiment, the third average particle size may be about 30 μm to about 80 μm.

In embodiment, the plurality of diamond particles may be bimodal and the first amount may be about 5 weight % to about 50 weight % of the plurality of diamond particles (e.g., about 20 weight % to about 50 weight %, about 20 weight % to about 45 weight %, about 25 weight % to about 40 weight %, about 15 weight % to about 45 weight %, about 20 weight % to about 30 weight %, about 5 weight %, about 25 weight %, about 20 weight % or more, or about 40 weight %) and the second amount may be about 50 weight % to about 95 weight % of the plurality of diamond particles (e.g., about 55 weight % to about 65 weight %, about 55 weight % to about 80 weight %, about 55 weight % to about 75 weight %, about 55 weight % to about 70 weight %, about 70 weight % to about 80 weight %, about 58 weight % to about 62 weight %, about 73 weight % to about 77 weight %, about 60 weight % to about 75 weight %, about 60 weight %, about 75 weight %, or about 95 weight %). In an embodiment, the first amount may be about 10 weight % to about 50 weight % of the plurality of diamond particles (e.g., about 10 weight % to about 40 weight %, about 20 weight % to about 30 weight %, about 35 weight % to about 45 weight %, about 23 weight % to about 27 weight %, about 38 weight % to about 42 weight %, about 25 weight %, or about 40 weight %) and the second amount may be about 60 weight % to about 95 weight % of the plurality of diamond particles (e.g., about 60 weight % to about 85 weight %, about 60 weight % to about 80 weight %, about 70 weight % to about 80 weight %, about 60 weight % to about 75 weight %, 60 weight % to about 65 weight %, about 75 weight %, 60 weight %, or about 60 weight %). For example, in an embodiment, the first amount may be about 38 weight % to about 42 weight % of the plurality of diamond particles and the second amount may be about 58 weight % to about 62 weight % of the plurality of diamond particles, with the first average particle size being about 12 μm and the second average particle size being about 20 μm.

In an embodiment, any combination of the following first and second average particle sizes may be combined with any of the disclosed first and second amounts: the first average particle size may be about 0.5 μm to about 32 μm (e.g., about 0.5 μm to about 30 μm, about 1 μm to about 30 μm, about 1 μm to about 16 μm, about 1 μm to about 14 μm, about 2 μm to about 16 μm, about 14 μm to about 18 μm, about 15 μm to about 17 μm, about 1 μm to about 3 μm, about 0.5 μm to about 5 μm, about 2 μm, about 4 μm, about 8 μm, about 10 μm, or about 16 μm) and the second average particle size may be about 10 μm to about 65 μm (e.g., about 10 μm to about 50 μm, 16 μm to about 65 μm, about 16 μm to about 35 μm, about 10 μm to about 50 μm, about 12 μm to about 30 μm, about 16 μm to about 30 μm, about 15 μm to about 17 μm, about 14 μm to about 18 μm, about 15 μm to about 20 μm, about 28 μm to about 32 μm, about 30 μm to about 32 μm, about 15 μm to about 32 μm, about 16 μm, or about 30 μm), wherein the second average particle size is greater than the first average particle size.

In a more detailed embodiment, the first amount may be greater than about 20 weight % or about 25 weight % to about 40 weight % (e.g., about 20 weight % or more, about 25 weight %, or about 40 weight %) with a first average particle size of about 2 μm to about 16 μm (e.g., about 2 μm), the second amount may about 50 weight % to about 75 weight % (e.g., about 60 weight %, or about 75 weight %) with a second average particle size of about 16 μm to about 30 μm (e.g., about 16 μm, or about 30 μm), and, when present, a third amount may about 0 weight % to about 25 weight % (e.g., about 15 weight %, or about 20 weight %) with a third average particle size of about 30 μm to about 65 μm (e.g., about 65 μm), wherein the third average particle or grain size is larger than the first and second average particle or grain sizes. In an embodiment, a ratio of the first average particle size to the second average particle size may be about 1:1.03 to about 1:130, such as about 1:8 to about 1:15, about 1:6 to about 1:10, about 1:13 to about 1:17, about 1:8, or about 1:15. Typically, leachability of the PCD table 102 so formed may be related to the weight % of the largest sized diamond particles or grains.

In an embodiment, the plurality of diamond grains or particles may have a trimodal size distribution. For example, the plurality of diamond particles may include a first amount or portion that is about 15 weight % to about 40 weight % of the plurality of diamond particles, a second amount or portion that is about 45 weight % to about 75 weight % of the plurality of diamond particles, and a third amount or portion that is about 5 weight % to about 35 weight % of the plurality of diamond particles. The first amount may exhibit a first average particle size of about 0.5 μm to about 5 μm, the second amount may exhibit a second average particle size that is larger than the first average particle size and about 10 μm to about 20 μm, and, the third amount may exhibit a third average particle size that is larger than the first and second average particle sizes and about 20 μm to about 45 μm.

In an embodiment, the first amount may be about 15 weight % to about 35 weight % or greater than about 20 weight % (e.g., about 20 weight % to about 30 weight %, about 24 weight % to about 28 weight %, about 25 weight %, or about 26 weight %), the second amount may be about 45 weight % to about 75 weight % (e.g., about 50 weight % to about 70 weight %, about 55 weight % to about 65 weight %, about 57 weight % to about 61 weight %, about 58 weight %, or about 59 weight %), and the third amount may be about 5 weight % to about 35 weight % (e.g., about 5 weight % to about 30 weight %, about 10 weight % to about 20 weight %, about 10 weight % to about 19 weight %, about 12 weight % to about 18 weight %, about 13 weight % to about 17 weight %, about 14 weight %, or about 15 weight %). In an embodiment, the first amount may be about 15 weight %, the second amount may be about 59 weight %, and the third amount may be about 26 weight %.

In an embodiment, any combination of the following first, second, and third average diamond particle sizes may be combined with any of the disclosed first, second, and third amounts: the first average diamond particle size may be about 0.5 μm to about 5 μm (e.g., about 1 μm to about 5 μm, about 1 μm to about 4 μm, about 1 μm to about 3 μm, about 0.5 μm to about 3 μm, about 1.5 μm to about 2.5 μm, or about 2 μm), the second average diamond particle size may be larger than the first average diamond particle size and about 12 μm to about 30 μm, about 15 μm to about 24 μm or about 10 µm to about 20 µm (e.g., about 10 µm to about 19 µm, about 12 µm to about 18 µm, about 13 µm to about 19 µm, about 14 µm to about 18 µm, about 15 µm to about 17 µm, or about 16 µm), and the third average diamond particle size may be larger than the first and second diamond particle sizes and about 20 µm to about 45 µm (e.g., about 20 µm to about 40 µm, about 25 µm to about 35 µm, about 27 µm to about 33 µm, about 29 µm to about 31 µm, or about 30 µm). In an embodiment, the first amount may be greater than about 20 weight % (e.g., 20 weight % or more), the first average diamond particle size may be about 0.5 µm to about 5 µm (e.g., about 2 µm) and the second average diamond particle size may be about 12 µm to about 30 µm (e.g., about 20 µm).

In an embodiment, the first amount is about 20 weight % to about 30 weight % (e.g., about 26 weight %) with a first average diamond particle size of about 1 µm to about 3 µm (e.g., about 2 µm), the second amount is about 55 weight % to about 65 weight % (e.g., about 59 weight %, or about 60 weight %) with a second average diamond particle size of about 14 µm to about 18 µm (e.g., about 16 µm), and the third amount is about 10 weight % to about 20 weight % (e.g., about 15 weight %) with a third average diamond particle size of about 25 µm to about 35 µm (e.g., about 27 µm to about 33 µm, or about 30 µm). Stated another way, a ratio of the first average particle size to the second average particle size to the third average particle size may be about 1:20:40 to about 1:4:9, such as about 1:8:15. Generally, wear resistance may increase as the weight % of the relatively smaller sized first and second amounts of diamond particles increases.

In some embodiments, the plurality of diamond particles may include a fourth amount or portion in addition to any of the first, second, and third amounts described above. A fourth average particle or grain size may be larger than the first, second, and third average particle or grain sizes. In some embodiments, the fourth amount may be about 5 weight % to about 30 weight % (e.g., about 10 weight % to about 30 weight %, about 15 weight % to about 27 weight %, about 12 weight % to about 26 weight %, about 22 weight %, or about 12 weight %) of the diamond particles and the average diamond particle size for the fourth amount may be about 65 µm and greater, such as about 65 µm to about 90 µm, about 65 µm, or about 85 µm. Any of the disclosed fourth amount weight percentages and fourth average grain sizes may be used in conjunction with any of the disclosed first, second, and third amount weight percentages and first, second, and third average particle or grain sizes.

In an embodiment, the layer 124 may also include at least one additive selected for accelerating leaching of the metal-solvent catalyst therefrom that together defines the interstitial regions having the metal-solvent catalyst disposed in at least a portion of the interstitial regions. For example, the at least one additive may include boron particles, boron carbide particles, particles made of refractory metals (e.g., niobium, molybdenum, tantalum, tungsten, rhenium, hafnium, or alloys thereof), or combinations thereof. The amount of the at least one additive present in the layer 124 may be greater than 0 weight % to about 5 weight % of the layer 124, such as greater than 0 weight % to about 0.5 weight %, about 0.05 weight % to about 0.1 weight %, or about 1 weight % to about 3 weight % of the layer 124. Some embodiments of suitable additives can be found in U.S. Pat. No. 8,663,349.

The PDC precursor assembly 118 may be subjected to an HPHT process to form the PDC 100 (shown in FIGS. 1A, 1B, and 2). The PCD precursor assembly 120 and the substrate 106 may be placed in a pressure transmitting medium to form the PDC precursor assembly 118. For example, the pressure transmitting medium may include a refractory metal can, graphite structure, pyrophyllite, other pressure transmitting structures, or combinations thereof. Examples of suitable gasket materials and cell structures for use in manufacturing PCD are disclosed in U.S. Pat. Nos. 6,338,754 and 8,236,074, each of which is incorporated herein, in its entirety, by this reference. Another example of a suitable pressure transmitting material is pyrophyllite, which is commercially available from Wonderstone Ltd. of South Africa. The PDC precursor assembly 118, including the pressure transmitting medium and the diamond particles therein, is subjected to an HPHT process at diamond-stable conditions using an ultra-high pressure press at a temperature of at least about 1000° C. (e.g., about 1100° C. to about 2200° C., or about 1200° C. to about 1450° C.) and a cell pressure in the pressure transmitting medium of at least about 5 GPa (e.g., about 5.0 GPa to about 6.5 GPa, about 7.5 GPa to about 15 GPa, about 7.7 GPa, or at least about 7.5 GPa) for a time sufficient to sinter the diamond particles together in the presence of the metal-solvent catalyst and form the PCD table 102 comprising directly bonded-together diamond grains defining interstitial regions occupied by a metal-solvent catalyst. For example, the pressure in the pressure transmitting medium employed in the HPHT process may be at least about 7.7 GPa, at least about 8.0 GPa, at least about 9.0 GPa, at least about 10.0 GPa, at least about 11.0 GPa, at least about 12.0 GPa, or at least about 14 GPa.

The pressure values employed in the HPHT processes disclosed herein refer to the pressure in the pressure transmitting medium at room temperature (e.g., about 25° C.) with application of pressure using an ultra-high pressure press and not the pressure applied to the exterior of the PDC precursor assembly 118. The actual pressure in the pressure transmitting medium at sintering temperature may be slightly higher. The ultra-high pressure press may be calibrated at room temperature by embedding at least one calibration material that changes structure at a known pressure such as, PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

The PDC 100 so-formed includes the PCD table 102, which is integrally formed with the substrate 106 and bonded to the interfacial surface 104 of the substrate 106. If the substrate 106 includes a metal-solvent catalyst (e.g., cobalt in a cobalt-cemented tungsten carbide substrate), the metal-solvent catalyst therein may liquefy and infiltrate the layer 124 to promote growth between adjacent diamond particles to catalyze formation of the PCD table 102. For example, if the substrate 106 is a cobalt-cemented tungsten carbide substrate, cobalt from the substrate 106 may be liquefied and infiltrate the layer 124 to catalyze formation of diamond-to-diamond bonding in the PCD table 102 during the HPHT process.

It should be noted that the plurality of diamond grains of the PCD table 102 may exhibit substantially the same or similar distribution and grain sizes to that of the diamond particles sizes and distributions described above in relation to FIG. 2. That is, the diamond particle amounts and sizes may not substantially change after sintering.

It is currently believed that as the sintering pressure employed during the HPHT process used to fabricate the PCD table 102 is moved further into the diamond-stable region away from the graphite-diamond equilibrium line, the rate of nucleation and growth of diamond increases. Such increased nucleation and growth of diamond between diamond particles (for a given diamond particle formulation) may result in the PCD table 102 being formed exhibiting a relatively lower metal-solvent catalyst content, a higher coercivity, a lower specific magnetic saturation, and/or a lower specific permeability (i.e., the ratio of specific magnetic saturation to coercivity) than a PCD table formed at a lower sintering pressure.

The metal-solvent catalyst that occupies the interstitial regions may be present in the PCD table 102 in an amount of about 7.5 weight % or less. In an embodiment, the metal-solvent catalyst may be present in the PCD table 102 in an amount of about 1 weight % to about 7.5 weight %, such as about 3 weight % to about 6 weight %, about 1 weight % to about 6 weight %, or below about 6 weight % of the total PCD table 102. In other embodiments, the metal-solvent catalyst content may be present in the PCD table 102 in an amount less than about 3 weight %, such as about 1 weight % to about 3 weight % or a residual amount to about 1 weight % of the total PCD table 102. By maintaining the metal-solvent catalyst content below about 7.5 weight %, the PCD table 102 may exhibit a desirable level of thermal stability suitable for subterranean drilling applications.

Many physical characteristics of the PCD table 102 may be determined by measuring certain magnetic properties of the PCD table 102 because the metal-solvent catalyst may be ferromagnetic (e.g., iron or cobalt). The amount of the metal-solvent catalyst present in the PCD table 102 may be correlated with the measured specific magnetic saturation of the PCD table 102. A relatively larger specific magnetic saturation indicates relatively more metal-solvent catalyst in the PCD table 102.

The mean free path between neighboring diamond grains of the PCD table 102 may be correlated with the measured coercivity of the PCD table 102. A relatively large coercivity indicates a relatively smaller mean free path. The mean free path is representative of the average distance between neighboring diamond grains of the PCD table 102 and, thus, may be indicative of the extent of diamond-to-diamond bonding in the PCD table 102. A relatively smaller mean free path, in well-sintered PCD, may indicate relatively more diamond-to-diamond bonding.

As merely one example, ASTM B886-03 (2008) provides a suitable standard for measuring the specific magnetic saturation and ASTM B887-03 (2008) el provides a suitable standard for measuring the coercivity of the PCD. Although both ASTM B886-03 (2008) and ASTM B887-03 (2008) el are directed to standards for measuring magnetic properties of cemented carbide materials, either standard may be used to determine the magnetic properties of PCD. A KOERZIMAT CS 1.096 instrument (commercially available from Foerster Instruments of Pittsburgh, Pa.) is one suitable instrument that may be used to measure the specific magnetic saturation and the coercivity of the PCD. A specific permeability or permeability (i.e., the ratio of specific magnetic saturation to coercivity) may be calculated for each tested PCD table by dividing the specific magnetic saturation by the coercivity. Examples of measuring magnetic properties, apparatuses for performing the same, and diamond compacts including various magnetic properties are described in U.S. Pat. No. 7,866,418, which is incorporated herein by this reference in its entirety.

Generally, as the sintering pressure that is used to form the PCD table 102 increases, the coercivity may increase and the magnetic saturation may decrease. The PCD table 102 defined collectively by the bonded diamond grains and the metal-solvent catalyst may exhibit a coercivity of about 115 Oersteds ("Oe") or more and a metal-solvent catalyst content of less than about 7.5 weight % as indicated by a specific magnetic saturation of about 15 Gauss·cm3/grams ("G·cm3/g") or less. In a more detailed embodiment, the coercivity of the PCD table 102 may be about 115 Oe to about 250 Oe and the specific magnetic saturation of the PCD may be greater than zero G·cm3/g to about 15 G·cm3/g. In an even more detailed embodiment, the coercivity of the PCD table 102 may be about 115 Oe to about 175 Oe and the specific magnetic saturation of the PCD may be about 5 G·cm3/g to about 15 G·cm3/g. In yet an even more detailed embodiment, the coercivity of the PCD table 102 may be about 150 Oe to about 175 Oe and the specific magnetic saturation of the PCD table 102 may be about 10 G·cm3/g to about 15 G·cm3/g. In an embodiment, the coercivity of the PCD table 102 may be about 150 Oe or more and the specific magnetic saturation of the PCD table 102 may be about 13 G·cm3/g or less, such as about 12 G·cm3/g. The specific permeability (i.e., the ratio of specific magnetic saturation to coercivity) of the PCD table 102 may be about 0.10 or less, such as about 0.060 to about 0.090, about 0.07 to about 0.085, or about 0.075 to about 0.08. Despite the average grain size(s) of the bonded diamond grains being about 30 μm or less, the metal-solvent catalyst content in the PCD table 102 may be less than about 7.5 weight % which may cause improved wear resistance and/or thermal stability.

Figure 3:
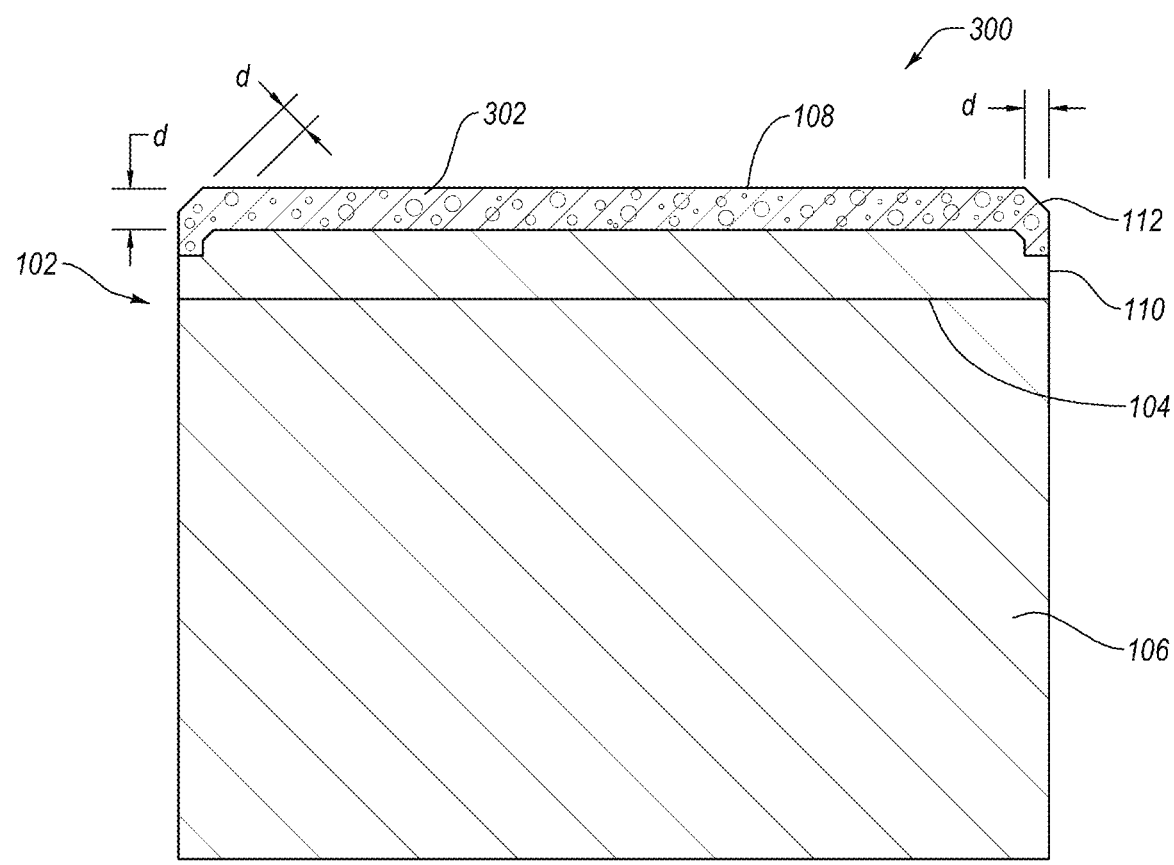
FIG. 3 is a cross-sectional view of the PDC shown in FIGS. 1A, 1B, and 2 in which a PCD table thereof has been at least partially leached.

Referring to FIG. 3, in an embodiment, after HPHT processing, the metal-solvent catalyst may be leached from the PCD table 102 shown in FIGS. 1A and 1B to a selected depth using a liquid acid leaching or a gaseous leaching process. In an embodiment, the leaching performed in either a leaching solution or a gaseous environment may be conducted in a pressurized atmosphere (e.g., a pressurized leaching vessel). Examples of some suitable leaching processes include electrochemical leaching such as disclosed in U.S. Provisional Patent Application Nos. 62/062,553 and 62/096,315, each of which is incorporated herein, in its entirety, by this reference. For example, FIG. 3 is a cross-sectional view of an embodiment of a PDC 300 in which the metal-solvent catalyst is at least partially leached from the PCD table 102 to a selected depth "d" as measured from at least one of the upper surface 108, at least one lateral surface 110, or chamfer 112 to form a leached region 302 that is at least partially depleted of the metal-solvent catalyst. For example, the leached region 302 may generally contour the upper surface 108, the chamfer 112, and the at least one lateral surface 110. The leached region 302 may also extend along a selected length of the at least one lateral surface 110. Generally, the selected depth "d" may be less than about 100 μm, greater than 250 μm, about 200 μm to about 600 μm, greater than 300 μm to about 425 μm, about 180 μm to about 265 μm, greater than 350 μm to about 400 μm, greater than 350 μm to about 375 μm, about 375 μm to about 400 μm, about 500 urn to about 650 μm, about 400 urn to about 600 μm, about 600 urn to about 800 μm, or about 10 urn to about 500 µm. In an embodiment, the depth "d" may vary depending on whether the depth "d" is measured from the upper surface 108 inward or the chamfer 112 inward. For example, the leach depth measured from the chamfer 112 may be greater than the leach depth measured from the upper surface 108. For example, the upper surface leach depth may be between about 400 and 550 µm (e.g., about 450 µm, or about 500 µm) and a corresponding chamfer leach depth may be between about 500 and 650 µm (e.g., about 550 µm, or about 600 µm).

In an embodiment, leaching may be carried out for a selected duration. For example, the PCD table 102 may be leached from hours to weeks including, but not limited to, about 24 hours to about 1 week, about 2 days to about 5 days, more than about 24 hours, more than about 100 hours, more than about 2 days, more than about 1 week, up to about 144 hours, up to about 1 week, up to about 2 weeks, about 24 hours, about 100 hours, about 144 hours, or about 1 week.

A residual amount of the metal-solvent catalyst may still be present in the leached region 302 even after leaching. For example, the metal-solvent catalyst may comprise about 0.01 weight % or more of the PCD table in the leached region 302, such as about 0.5 weight % to about 1.50 weight % and, more particularly, about 0.5 weight % to about 0.8 weight %, about 0.9 weight % to about 1.2 weight %, or less than about 0.8 weight % of the leached region 302. The leaching may be performed in a suitable acid (e.g., aqua regia, nitric acid, hydrochloric acid, hydrofluoric acid, or combinations thereof) so that the leached region 302 of the PCD table 102 is substantially free of the metal-solvent catalyst. As a result of the metal-solvent catalyst being depleted from the leached region 302, the at least partially leached PCD table 102 is relatively more thermally stable than prior to leaching. As previously discussed, the selected diamond grain size distribution of the PCD table 102 allows for relatively faster and/or more complete leaching of the metal-solvent catalyst.

In some embodiments, the leaching to form the leached region 302 may be accomplished by exposing the PCD table 102 to a gaseous leaching agent that is selected to substantially remove all of the metal-solvent catalyst from the interstitial regions of the PCD table 102. For example, a gaseous leaching agent may be selected from at least one halide gas, at least one inert gas, a gas from the decomposition of an ammonium halide salt, hydrogen gas, carbon monoxide gas, an acid gas, and mixtures thereof. For example, a gaseous leaching agent may include mixtures of a halogen gas (e.g., chlorine, fluorine, bromine, iodine, or combinations thereof) and an inert gas (e.g., argon, xenon, neon, krypton, radon, or combinations thereof). Other gaseous leaching agents include mixtures including hydrogen chloride gas, a reducing gas (e.g., carbon monoxide gas), gas from the decomposition of an ammonium salt (such as ammonium chloride which decomposes into chlorine gas, hydrogen gas and nitrogen gas), and mixtures of hydrogen gas and chlorine gas (which will form hydrogen chloride gas, in situ), acid gases such as hydrogen chloride gas, hydrochloric acid gas, hydrogen fluoride gas, and hydrofluoric acid gas. Any combination of any of the disclosed gases may be employed as the gaseous leaching agent. In an embodiment, a reaction chamber may be filled with a gaseous leaching agent of about 10 volume % to about 20 volume % chlorine with the balance being argon and the gaseous leaching agent being at an elevated temperature of at least about 300° C. to about 800° C. In another embodiment, the elevated temperature may be between at least about 600° C. to about 700° C. More specifically, in another embodiment, the elevated temperature may be at least about 650° C. to about 700° C. Additional details about gaseous leaching processes for leaching PCD are disclosed in U.S. application Ser. No. 13/324,237. U.S. application Ser. No. 13/324,237 is incorporated herein, in its entirety, by this reference.

Figure 4:
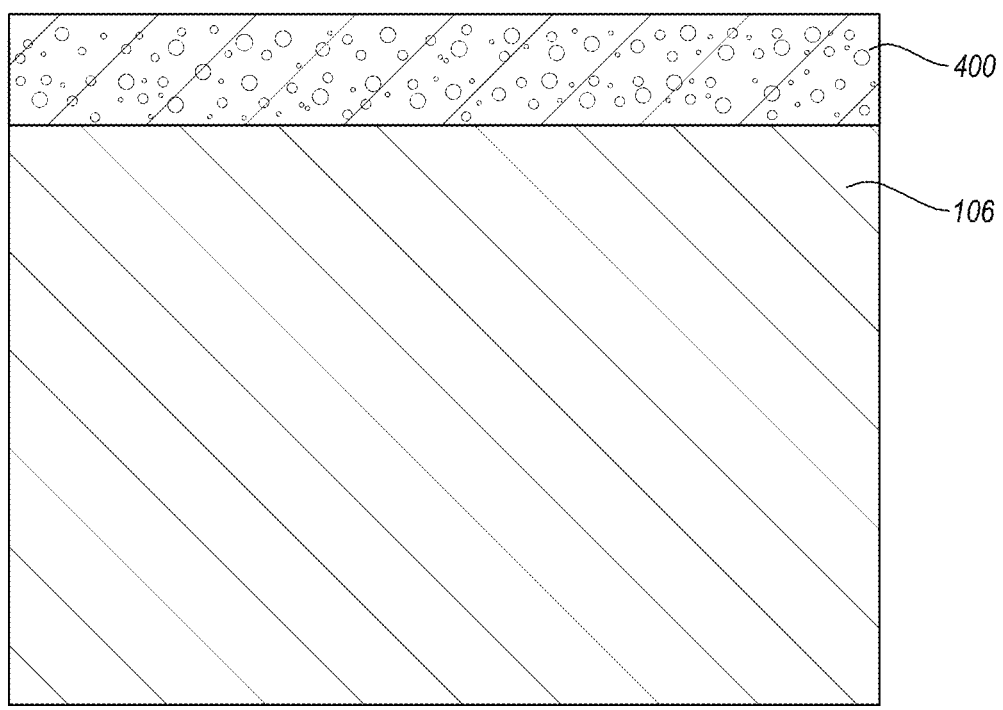
FIG. 4 is an assembly to be HPHT processed including a leached PCD table assembled with a substrate.

In other embodiments, the PCD table 102 may be initially formed using an HPHT sintering process (i.e., a pre-formed PCD table) and, subsequently, bonded to the interfacial surface 104 of the substrate 106 by brazing, using a separate HPHT bonding process, or any other suitable joining technique, without limitation. For example, the PCD table 102 may be HPHT sintered and then separated from the substrate 106 using any suitable material removal process, such as grinding or machining. In another embodiment, a PCD table may be HPHT sintered without a substrate, such as by infiltrating the diamond particles from a disc of metal-solvent catalyst. The PCD table 102 may be leached to at least partially remove or to remove substantially all of the metal-solvent catalyst therein. As previously discussed, the selected diamond grain size distribution of the PCD table 102 enables relatively more complete leaching. As shown in FIG. 4, in an embodiment, an at least partially leached PCD table 400 may be placed adjacent to another substrate 106 and subjected to any of the HPHT processes disclosed herein so that a metallic infiltrant from the substrate 106 (e.g., cobalt from a cobalt-cemented tungsten carbide substrate) or another source (e.g., a disk of metallic infiltrant) re-infiltrates the at least partially leached PCD table 102. The infiltrated PCD table bonds to the substrate 106 during cooling from the HPHT process. The infiltrated PCD table may be at least partially leached to form a PDC configured the same or similarly to the PDC 300 shown in FIG. 3.

Working and Prophetic Examples 1-12

The following working and prophetic examples provide further detail in connection with the specific embodiments described above. Working examples 4-7 fabricated according to specific embodiments of the invention are compared to comparative working examples 1-3, 8, and 9. Prophetic examples 10-12 and their predicted leach depths are also described below.

Comparative Working Example 1

PDCs were formed according to the following process. A layer of diamond particles having an average particle size of about 20 µm mixed with about 0.1 weight % boron was disposed on a cobalt-cemented tungsten carbide substrate. The layer of diamond particles and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table was leached to for about 144 hours in a mixture of hydrofluoric acid and nitric acid to produce a leach depth of about 582 µm on average for the samples.

Figure 5A:
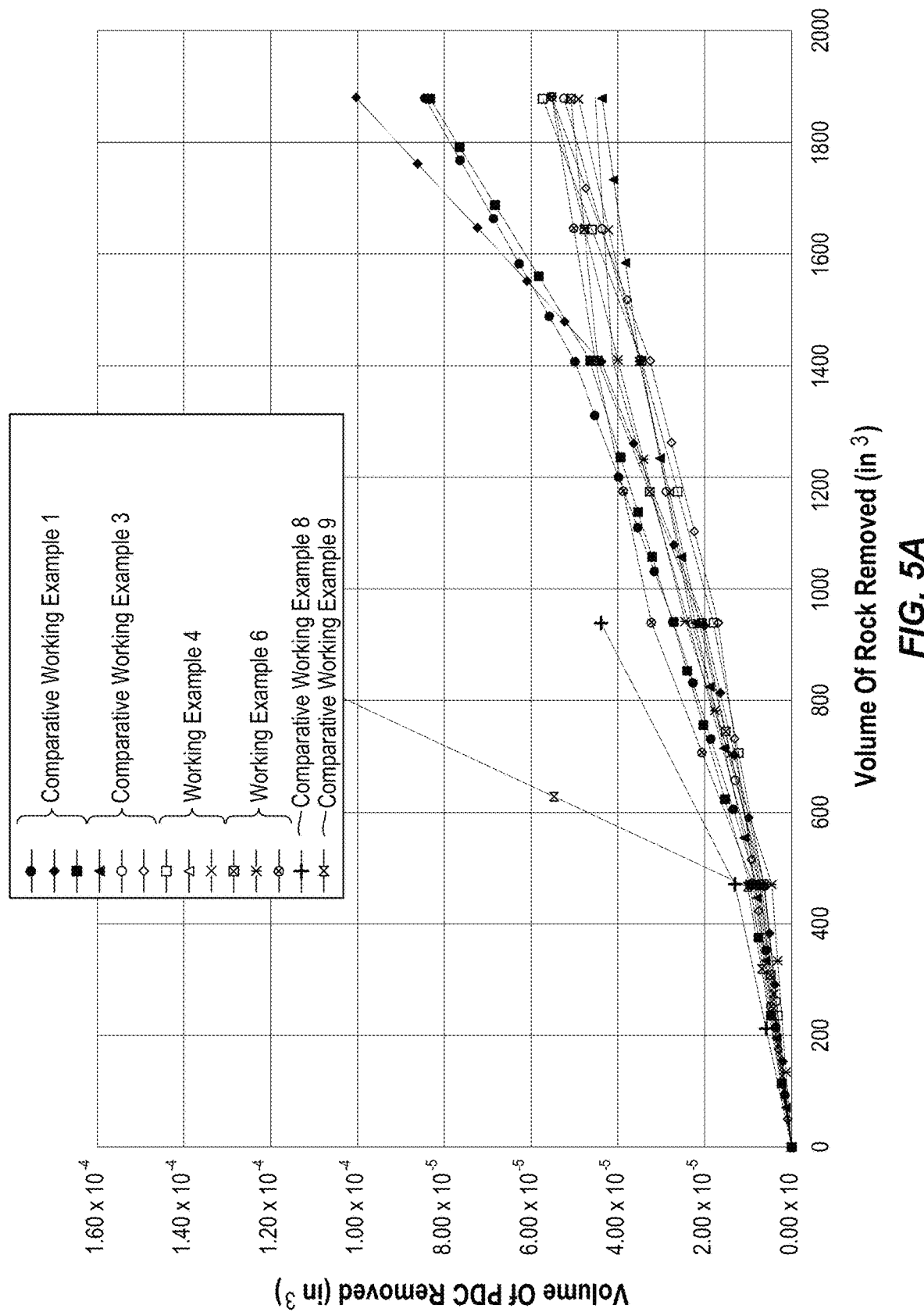
FIG. 5A is a graph of wear resistance test data for PDCs according to various working examples of invention and various comparative working examples.

The abrasion resistance of the PDCs of comparative working example 1 was evaluated using a VTL test by measuring the volume of PDC removed versus the volume of Barre granite workpiece removed, while the workpiece was cooled with water. The test parameters used were a depth of cut for the PDC of about 0.254 mm, a back rake angle for the PDC of about 20 degrees, an in-feed for the PDC of about 6.35 mm/rev, and a rotary speed of the workpiece to be cut of about 101 RPM. FIG. 5A shows the abrasion resistance VTL test results for the PDC of comparative working example 1.

Comparative Working Example 2

PDCs were formed according to the process described above for working example 1 except no boron was mixed with the diamond particles.

Comparative Working Example 3

PDCs were formed according to the following process. A layer of diamond particles having an average particle size of about 19 µm was disposed on a cobalt-cemented tungsten carbide substrate. The layer of diamond particles and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table was leached to for about 144 hours in a mixture of hydrofluoric acid and nitric acid to produce a leach depth of about 418 µm on average for the samples.

The abrasion resistance of the PDCs of comparative working example 3 was evaluated by measuring the volume of PDC removed versus the volume of Barre granite workpiece removed, while the workpiece was cooled with water, using the same workpiece and the same test parameters as comparative working example 1.

Working Example 4

PDCs were formed according to the following process. Diamond particles (about 40 weight percent diamond particles having an average particle size of about 12 µm and about 60 weight percent diamond particles having an average particle size of about 20 µm) was mixed with 0.1 weight % boron particles to form a mixture. The mixture of diamond particles and boron particles was disposed on a cobalt-cemented tungsten carbide substrate. The mixture and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table was leached for about 144 hours in a mixture of hydrofluoric acid and nitric acid to produce a leach depth of about 528 µm on average for the samples.

The abrasion resistance of the PDCs of working example 4 was evaluated by measuring the volume of PDC removed versus the volume of Barre granite workpiece removed, while the workpiece was cooled with water, using the same workpiece and the same test parameters as comparative working example 1.

Working Example 5

PDCs were formed according to the process described above for working example 3 except no boron was added.

Working Example 6

PDCs were formed according to the following process. Diamond particles (about 60 weight percent diamond particles having an average particle size of about 12 µm and about 40 weight percent diamond particles having an average particle size of about 20 µm) was mixed with 0.1 weight % boron particles to form a mixture. The mixture of diamond particles and boron particles was disposed on a cobalt-cemented tungsten carbide substrate. The mixture and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table was leached for about 144 hours in a mixture of hydrofluoric acid and nitric acid to produce a leach depth of about 496 µm on average for the samples.

The abrasion resistance of the PDCs of working example 6 was evaluated by measuring the volume of PDC removed versus the volume of Barre granite workpiece removed, while the workpiece was cooled with water, using the same workpiece and the same test parameters as comparative working example 1.

Working Example 7

PDCs were formed according to the process described above for working example 5 except no boron was added.

Comparative Working Example 8

A PDC was formed according to the following process. A first layer of diamond particles having an average particle size of about 19 µm was disposed on a cobalt-cemented tungsten carbide substrate. The layer of diamond particles and the cobalt-cemented tungsten carbide substrate were HPHT processed in a high-pressure cubic press at a temperature of about 1400° C. and a cell pressure of approximately 5.5 GPa to form a PDC comprising a PCD table integrally formed and bonded to the cobalt-cemented tungsten carbide substrate. The PCD table was leached to a depth of about 292 µm.

The abrasion resistance of the conventional PDC of comparative working example 8 was evaluated by measuring the volume of PDC removed versus the volume of Barre granite workpiece removed using the same test parameters and workpiece as comparative working example 1.

Comparative Working Example 9

A PDC was formed according to the following process. A first layer of diamond particles having an average particle size of about 19 µm was disposed on a cobalt-cemented tungsten carbide substrate. The layer of diamond particles and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table of comparative working example 6 was unleached.

The abrasion resistance of the conventional PDC of comparative working example 9 was evaluated by measuring the volume of PDC removed versus the volume of Barre granite workpiece removed using the same test parameters and workpiece as working example 1.

Comparison of Test Results

The wear resistance graph of FIG. 5A showed that working examples 4 and 6 exhibited comparable wear resistance to comparative working examples 1 and 3 and better wear resistance than that of comparative working examples 8 and 9. Furthermore, working examples 4 and 6 leached relatively quickly compared to some of the other working examples, but exhibited a relatively high wear resistance compared to other fast leaching comparative working examples, such as comparative working example 1 which had a comparatively large diamond grain size. Thus, working examples 4 and 6 provided relatively fast leaching to a given leach depth, while not compromising wear resistance.

Figure 5B:
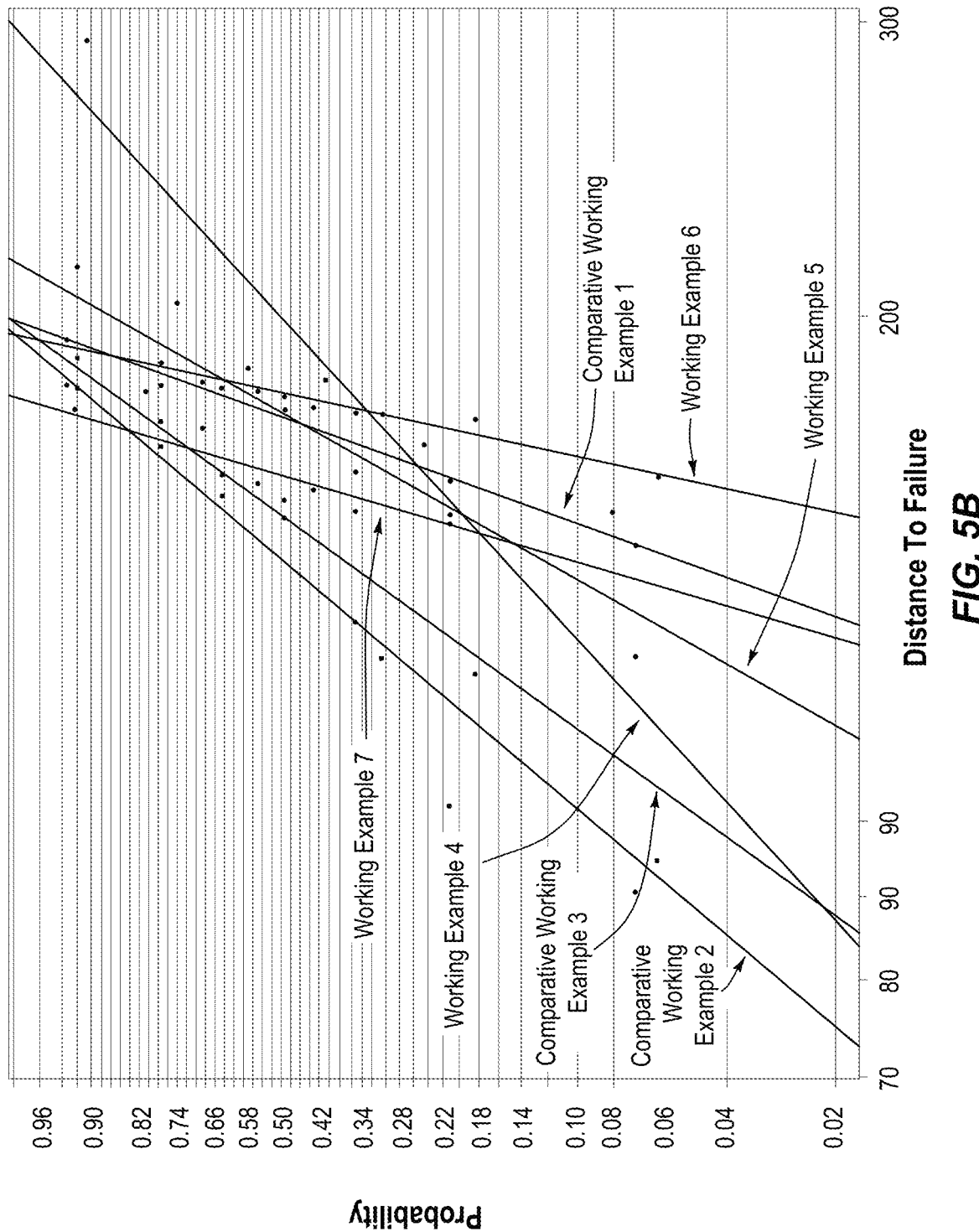
FIG. 5B is a graph of probability of failure versus distance to failure for PDCs according to various working examples of invention and various comparative working examples.

Thermal stability testing was also performed on PDCs of working examples 1-7. The results of the thermal stability testing are shown in FIG. 5B. The thermal stability was evaluated in a mill test in which a PDC is used to cut a Barre granite workpiece. The test parameters used were an in-feed for the PDC of about 50.8 cm/min, a width of cut for the PDC of about 7.62 cm, a depth of cut for the PDC of about 0.762 mm, a rotary speed of the workpiece to be cut of about 300 RPM, and an indexing in the Y direction across the workpiece of about 7.62 cm. Working example 6 exhibited the best thermal stability, but working examples 4, 5, and 7 also exhibited relatively high thermal stability and a good balance of other properties, such as leachability and wear resistance. Additionally, the PCD tables of working examples 4-7 also exhibited good non-leached abrasion resistance, while still being leachable.

Prophetic Example 10

A PDC is formed according to the following process. A mixture of diamond particles having about 50 weight percent diamond particles with an average particle size of about 20 μm and about 50 weight percent diamond particles with an average particle size of about 40 μm is formed. The mixture of diamond particles is disposed on a cobalt-cemented tungsten carbide substrate. The mixture and the cobalt-cemented tungsten carbide substrate is HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table is predicted to be leachable to a leach depth of about 226 μm±15 μm when leached in a mixture of hydrofluoric acid and nitric acid for 24 hours.

Prophetic Example 11

A PDC is formed according to the following process. A mixture of diamond particles having about 50 weight percent diamond particles with an average particle size of about 12 μm and about 50 weight percent diamond particles with an average particle size of about 40 μm is formed. The mixture of diamond particles is disposed on a cobalt-cemented tungsten carbide substrate. The mixture and the cobalt-cemented tungsten carbide substrate is HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table is predicted to be leachable to a leach depth of about 250 μm±15 μm when leached in a mixture of hydrofluoric acid and nitric acid for 24 hours.

Prophetic Example 12

A PDC is formed according to the following process. A mixture of diamond particles having about 45 weight percent diamond particles with an average particle size of about 12 μm, about 34 weight percent diamond particles with an average particle size of about 20 μm, and about 21 weight percent diamond particles with an average particle size of about 40 μm is formed. The mixture of diamond particles is disposed on a cobalt-cemented tungsten carbide substrate. The mixture and the cobalt-cemented tungsten carbide substrate is HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table is predicted to be leachable to a leach depth of about 246 μm±15 μm when leached in a mixture of hydrofluoric acid and nitric acid for 24 hours.

Working Examples 13-17

The following working examples provide further detail in connection with the specific embodiments described above. Working examples 13-16, fabricated according to specific embodiments of the invention, are compared to standard working example 17.

Working Example 13

Figure 6A:
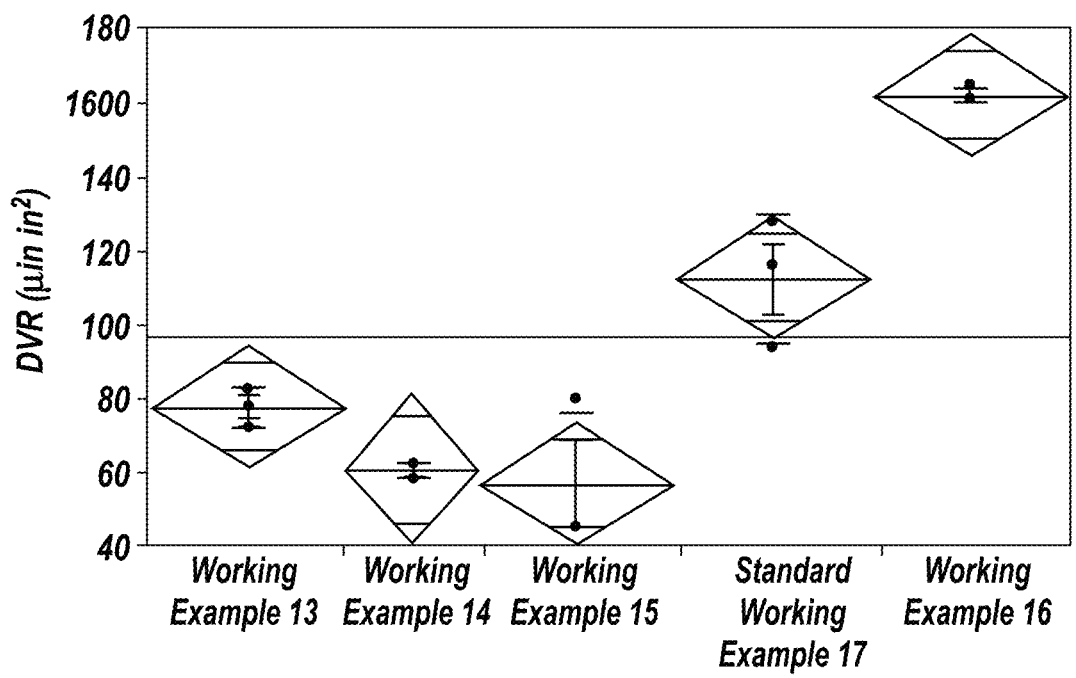
FIG. 6A is a graph of wear resistance test data for PDCs according to various working examples.
Figure 6B:
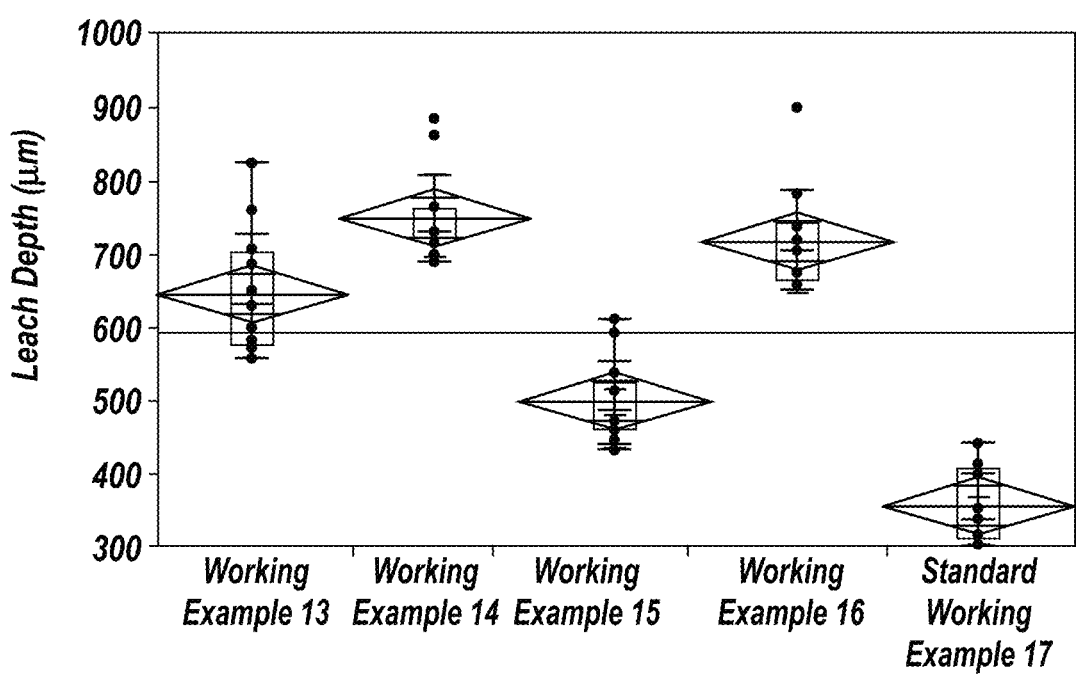
FIG. 6B is a graph of leach depth for PDCs according to various working examples.

PDCs were formed according to the following process. A mixture of diamond particles including about 40 weight % of diamond particles exhibiting an average particle size of about 2 μm and about 60 weight % of diamond particles exhibiting an average particle size of about 16 μm was disposed on a cobalt-cemented tungsten carbide substrate. The mixture of diamond particles and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table was leached for about 144 hours in hydrofluoric acid to produce a leach depth of about 648 μm on average for the samples. FIG. 6B shows the leach depth test results for the PCDs tested, including working example 13.

The abrasion resistance of the PDCs of working example 13 was evaluated using a VTL test by measuring the volume of PDC removed and the volume of Barre granite workpiece removed, while the workpiece was cooled with water. The test parameters used were a depth of cut for the PDC of about 0.254 mm, a back rake angle for the PDC of about 20 degrees, an in-feed for the PDC of about 6.35 mm/rev, and a rotary speed of the workpiece to be cut of about 101 RPM. The volume of Barre granite removed for 50 passes was about 470 in3 and for 250 passes was about 2350 in3. FIG. 6A shows the abrasion resistance in the VTL test results for the PDC of working example 13 which demonstrate higher average abrasion resistance over standard working example 17.

Working Example 14

PDCs were formed according to the process described above for working example 13 except the mixture of diamond particles included about 40 weight % of diamond particles exhibiting an average particle size of about 2 μm and about 60 weight % of diamond particles exhibiting an average particle size of about 30 μm.

Working example 14 was leached and VTL tested in the same manner as working example 13. The average leach depth of working example 2 was about 750 μm. The DVR measured was about 61 μinch·inch2 and demonstrated higher average abrasion resistance compared to the standard working example.

Working Example 15

PDCs were formed according to the process described above for working example 13 except the mixture of diamond particles included about 25 weight % of diamond particles exhibiting an average particle size of about 2 μm and about 75 weight % of diamond particles exhibiting an average particle size of about 16 μm.

Working example 15 was leached and VTL tested in the same manner as working example 13. The average leach depth of working example 3 was about 500 μm. The DVR measured was about 57 μinch·inch2 and demonstrated higher average abrasion resistance compared to all of the working examples tested.

Working Example 16

PDCs were formed according to the process described above for working example 13 except the mixture of diamond particles included about 25 weight % of diamond particles exhibiting an average particle size of about 2 μm and about 75 weight % of diamond particles exhibiting an average particle size of about 30 μm.

Working example 16 was leached and VTL tested in the same manner as working example 13. The average leach depth of working example 4 was about 720 μm. The DVR measured was about 162 μinch·inch2.

Standard Working Example 17

Working example 17 was formed as a standard against which working examples 13-16 were compared. PDCs for standard working example 17 were formed according to the process described above for working example 13 except the mixture of diamond particles included about 5 weight % of diamond particles exhibiting an average particle size of about 2 μm and about 95 weight % of diamond particles exhibiting an average particle size of about 30 μm. Standard working example 17 PDCs were leached and VTL tested in the same manner as working example 13.

Comparison of Test Results

The wear resistance graph of FIG. 6A showed that working examples 13-15 exhibited better wear resistance than standard working example 17. Working examples 13 and 14 leached relatively faster (deeper) compared to some of the other working examples and exhibited a relatively high average wear resistance compared to other working examples, such as working example 16. Thus, working examples 13 and 14 provided relatively fast leaching to a given leach depth, while not compromising wear resistance. Working example 15 leached faster on average than standard working example 17 and exhibited the highest average wear resistance of the working examples tested.

Leach depth testing was also performed on PDCs of working examples 13-17. The results of the leach depth testing are shown in FIG. 6B. The leach depth was evaluated by leaching each of the PCDs in a hydrofluoric acid solution for about 144 hours. The resulting leached PDCs were then analyzed to determine leach depth. Working examples 13, 14 and 16 exhibited the highest average leach depth, and working example 15 also exhibited a higher average leach depth than standard working example 17. Additionally, the PCD tables of working examples 13-15 also exhibited higher average abrasion resistance, while still being leachable. Working examples 13 and 14 exhibited a good balance of leachability and abrasion resistance, while example 15 exhibited the highest average abrasion resistance coupled with higher average leachability than standard working example 17. For example, as demonstrated in FIG. 6A, at 250 passes in wet VTL testing, working example 15 has about 50% less wear than standard working example 17. One PDC from working example 15 exhibited an average leach depth of about 480 μm (including an average upper surface leach depth of about 450 μm), wherein the chamfer leach depth was about 594 μm.

As noted above, the inventors expected that as the weight % of the smaller particles increased, the wear resistance (as measured by wet VTL) would increase. As FIGS. 6A and 6B demonstrate, working example 15 unexpectedly demonstrated greater average wear resistance than working example 13 despite the fact that working example 13 contains a larger amount (e.g., weight %) of the smaller diamond particles than working example 15. Moreover, working examples 13-16 had unexpectedly larger average leach depth values than standard working example 17. For example, working example 14 includes about 40 weight % of 2 μm diamond particles and about 60 weight % of 30 μm diamond particles. Further, notwithstanding that working example 15 contains less of a larger average particle size and more of the smaller average particle size (e.g., about 25 weight % of about 2 μm diamond particles and about 75 weight % of about 16 μm diamond particles) compared to standard working example 17 (e.g., about 5 weight % of about 2 μm diamond particles and about 95 weight % of about 30 μm diamond particles), FIG. 6B demonstrates that working example 15 unexpectedly demonstrated higher average leachability than standard working example 17. Similar results are demonstrated by working examples 13, 14, and 16.

Figure 6C:
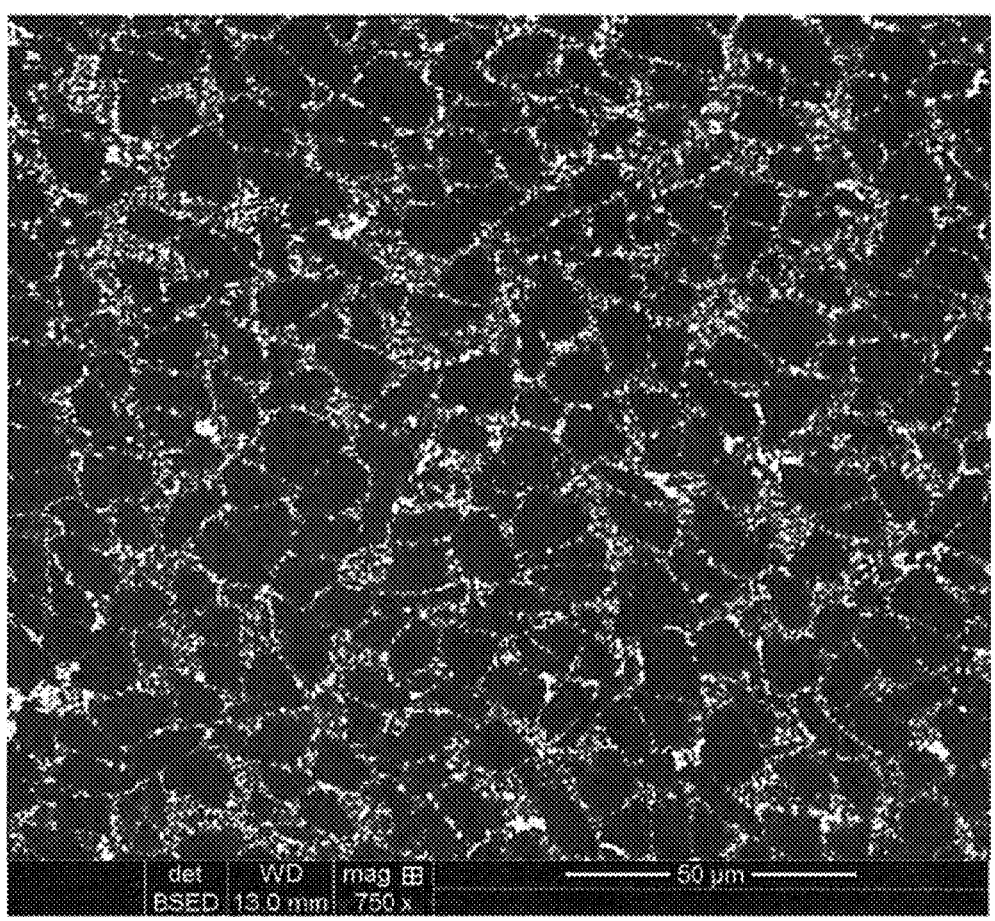
FIG. 6C is a photomicrograph of the PCD table of working example 15.
Figure 6D:
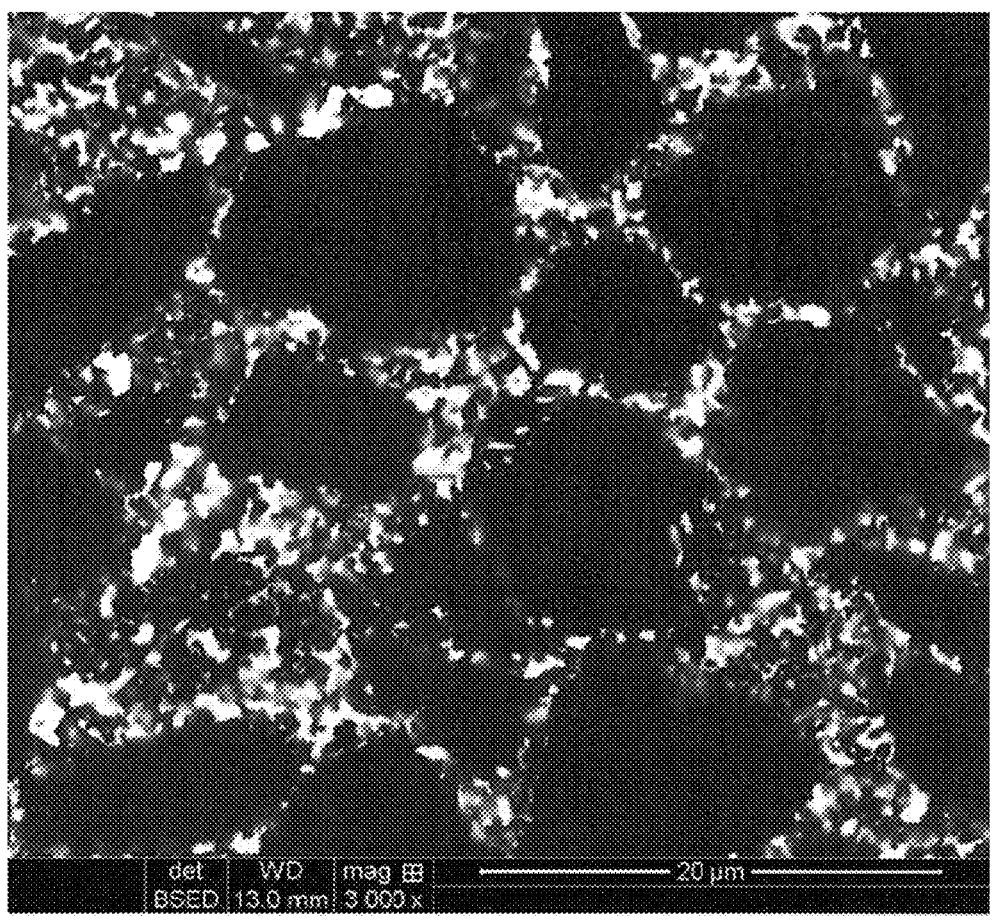
FIG. 6D is a photomicrograph of the PCD table of working example 15.

FIGS. 6C and 6D are micrographs of a PCD table formed according to working example 15. FIG. 6C is a scanning electron micrograph of a portion of cross section of a PCD table formed according to working example 15 at 750× magnification. FIG. 6D depicts the same table depicted in FIG. 6C at 3000× magnification. As explained above, working example 15 includes about 25 weight % of diamond particles exhibiting about 2 μm average diamond particle size and 75 weight % of diamond particles exhibiting about 16 μm average diamond particle size. The micrographs depict a plurality of larger diamond particles (i.e., average diamond particles size of about 16 μm) having interstitial spaces therebetween filled with a plurality of smaller diamond particles (i.e., average diamond particle size of about 2 μm). The smaller diamond particles may fill the interstitial spaces between the larger diamond particles to increase diamond density or diamond volume percentage. As depicted in FIGS. 6C and 6D, the resulting PCD table may also include a catalyst material (e.g., cobalt) in the interstitial spaces between diamond particles. The catalyst material may be removed from the PCD table according to any of the techniques described above. The resulting leached PCD table may exhibit porosity between the pluralities of diamond particles therein. Porosity of PCD tables may be measured using porosimetry techniques, such as any of those described in U.S. Provisional Patent Application No. 61/846,138 and U.S. patent application Ser. No. 14/329,552. For example, mercury porosimetry measurements may be performed on a sample PCD table in its leached or unleached condition to measure porosity and other characteristics.

Working Examples 18-22

The following working examples provide further detail in connection with the specific embodiments described above. Working examples 19-22, fabricated according to specific embodiments of the invention, are compared to standard working example 18.

Standard Working Example 18

Figure 7A:
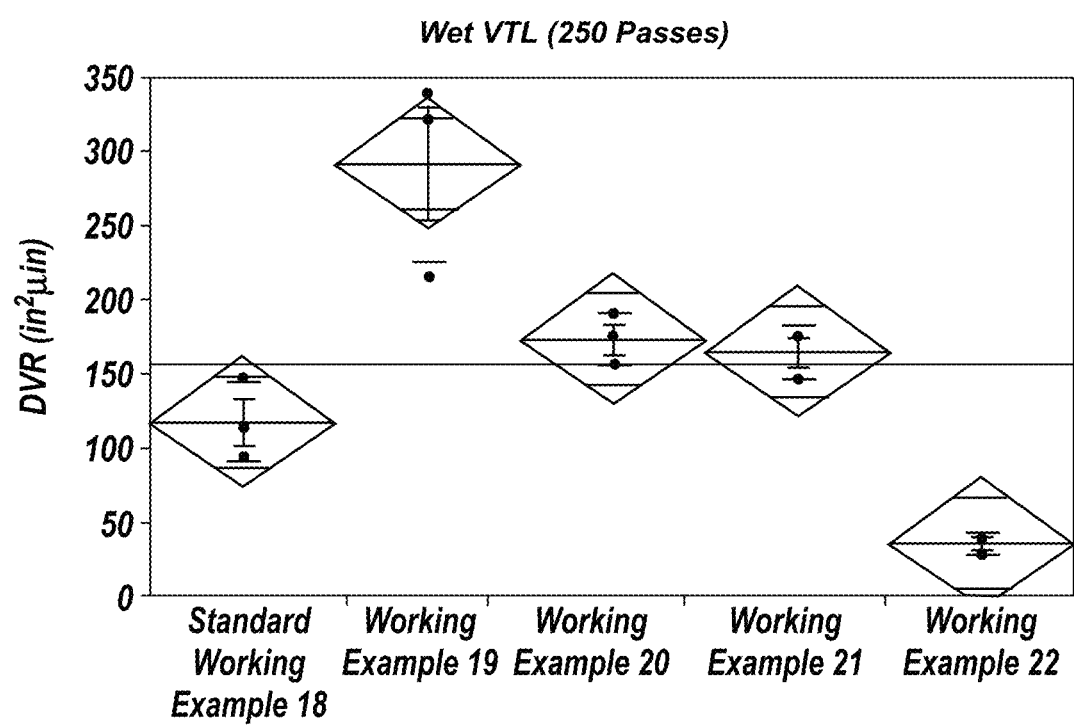
FIG. 7A is a graph of wear resistance test data for PDCs according to various working examples.
Figure 7B:
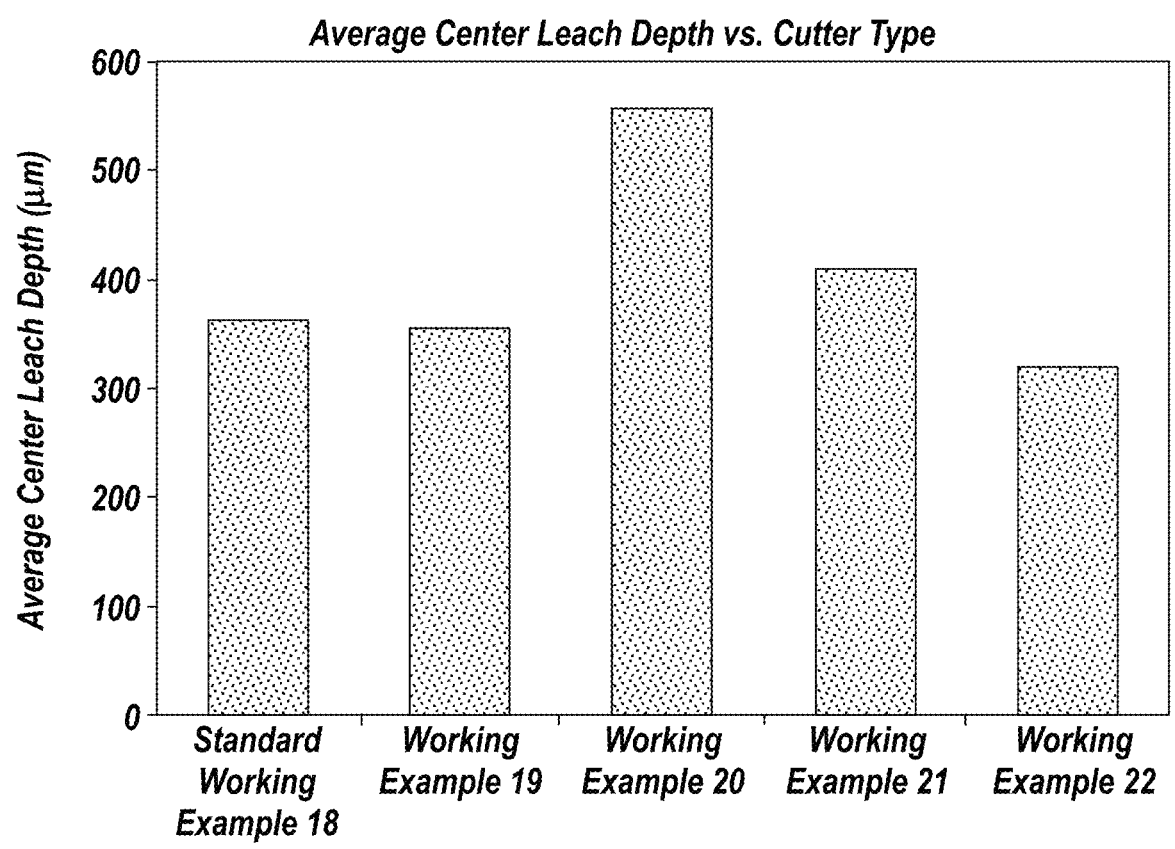
FIG. 7B is a graph of the average center leach depths for PCD tables according to various working examples.

PDCs of standard working example 18 were formed according to the following process. A mixture of diamond particles including about 5 weight % of diamond particles exhibiting an average particle size of about 2 μm and about 95 weight % of diamond particles exhibiting an average particle size of about 30 μm was disposed on a cobalt-cemented tungsten carbide substrate. The mixture of diamond particles and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. The PCD table was leached for about 144 hours in hydrofluoric acid to produce a center leach depth of about 361 μm, on average, for the samples of standard working example 18. The average center leach depth being the average leach depth of a group of PCD tables as measured from approximately the center of the surface of a PCD table. FIG. 7B shows the leach depth test results for the PCDs tested, including standard working example 18.

The abrasion resistance of the PDCs of standard working example 18 was evaluated using a VTL test by measuring the volume of PCD removed and the volume of Barre granite workpiece removed after 250 passes, while the workpiece was cooled with water. The test parameters used were a depth of cut for the PDC of about 0.254 mm, a back rake angle for the PDC of about 20 degrees, an in-feed for the PDC of about 6.35 mm/rev, and a rotary speed of the work piece to be cut of about 101 RPM. The average volume of diamond removed ("DVR") from standard working example 18 after 250 passes was about 118 μinch·in2. FIG. 7A shows the abrasion resistance in the VTL test results for the PDC of standard working example 18. The VTL test results for working examples 19-22 were compared to the VTL test results for standard working example 18.

The PCD tables formed according to standard working example 18, except remaining unleached, were separated from their respective substrates and tested for magnetic properties. The specific magnetic saturation of each PCD table was measured in accordance with ASTM B886-03 (2008) and the coercivity of each PCD table was measured using ASTM B887-03 (2008) e1 using a KOERZIMAT CS 1.096 instrument.

Table I below lists the measured magnetic properties of PCD tables that were fabricated in accordance with standard working example 18 but were not leached prior to testing.

TABLE I

Diamond Mix: 95 weight % (30 μm) 5 weight % (2 μm)

| No. | Coercivity (Oe) | Weight (g) | Specific Magnetic Saturation (G · cm³/g) | Specific Permeability (G · cm³/g · Oe) | Weight % of Cobalt |
|---|---|---|---|---|---|
| 1 | 133.6 | 1.203 | 10.3 | 0.077096 | 5.128 |
| 2 | 127.8 | 1.128 | 10.61 | 0.08302 | 5.281 |
| 3 | 132.6 | 1.271 | 10.3 | 0.077677 | 5.128 |
| 4 | 133.6 | 1.229 | 10.39 | 0.077769 | 5.173 |
| 5 | 132.8 | 1.175 | 10.2 | 0.076807 | 5.079 |
| 6 | 131.9 | 1.205 | 10.49 | 0.07953 | 5.22 |
| 7 | 131.5 | 1.182 | 10.31 | 0.078403 | 5.131 |
| 8 | 129.3 | 1.211 | 10.63 | 0.082212 | 5.293 |
| 9 | 131.8 | 1.251 | 10.29 | 0.078073 | 5.122 |
| 10 | 142.7 | 1.238 | 10.89 | 0.076314 | 5.42 |

As demonstrated in Table I, the tested samples of standard working example 18 exhibited an average coercivity of about 132.7 Oe, with individual samples exhibiting a measured coercivity ranging from about 127.8 Oe to about 142.7 Oe. The tested samples of standard working example 18 exhibited an average specific magnetic saturation of about 10.4 G·cm3/g, with individual samples exhibiting a measured specific magnetic saturation ranging from about 10.2 G·cm3/g to about 10.9 G·cm3/g. The tested samples of standard working example 18 exhibited an average specific permeability of about 0.079 G·cm3/g·Oe, with individual samples exhibiting a measured specific permeability ranging from about 0.076 G·cm3/g·Oe to about 0.083 G·cm3/g·Oe. The average percentage of metal-solvent catalyst (i.e., cobalt) in the PCD tables of standard working example 18 was about 5.19 weight %, with individual samples ranging from about 5.08 weight % to about 5.42 weight %.

Working Example 19

PDCs were formed according to the process described above for standard working example 18 except the mixture of diamond particles included a first amount of diamond particles of about 16 weight % of the mixture of diamond particles and exhibiting an average diamond particle size of about 2 μm, a second amount of diamond particles of about 27 weight % of the mixture of diamond particles and exhibiting an average particle size of about 16 μm, a third amount of diamond particles of about 31 weight % of the mixture of diamond particles and exhibiting an average particle size of about 30 μm, and a fourth amount of diamond particles of about 26 weight % of the mixture of diamond particles and exhibiting an average particle size of about 65 μm.

Working example 19 was leached and VTL tested in the same manner as standard working example 18. The average center leach depth of working example 19 was about 357 μm. The DVR after 250 passes measured was about 292 μinch·inch2.

Working Example 20

PDCs were formed according to the process described above for standard working example 18 except the mixture of diamond particles included a first amount of diamond particles of about 30 weight % of the mixture of diamond particles and exhibiting an average diamond particle size of about 2 μm, a second amount of diamond particles of about 22 weight % of mixture of diamond particles and exhibiting an average particle size of about 16 μm, a third amount of diamond particles of about 26 weight % of mixture of diamond particles and exhibiting an average particle size of about 30 μm, and a fourth amount of diamond particles of about 22 weight % of the mixture of diamond particles and exhibiting an average particle size of about 65 μm.

Working example 20 was leached and VTL tested in the same manner as standard working example 18. The average center leach depth of working example 20 was about 558 μm, demonstrating a significantly deeper leach depth over standard working example 18. The DVR measured after 250 passes was about 174 μinch·inch2.

Working Example 21

PDCs were formed according to the process described above for standard working example 18 except the mixture of diamond particles included a first amount of diamond particles of about 17 weight % of the mixture of diamond particles and exhibiting an average diamond particle size of about 2 μm, a second amount of diamond particles of about 36 weight % of the mixture of diamond particles and exhibiting an average particle size of about 16 μm, a third amount of diamond particles of about 35 weight % of the mixture of diamond particles and exhibiting an average particle size of about 30 μm, and a fourth amount of diamond particles of about 12 weight % of the mixture of diamond particles and exhibiting an average particle size of about 65 μm.

Working example 21 was leached and VTL tested in the same manner as standard working example 18. The average center leach depth of working example 21 was about 411 μm. The DVR measured after 250 passes was about 165 μinch·inch2.

Working Example 22

PDCs were formed according to the process described above for standard working example 18 except the mixture of diamond particles included a first amount of diamond particles of about 26 weight % of the mixture of diamond particles and exhibiting an average diamond particle size of about 2 μm, a second amount of diamond particles of about 59 weight % of the mixture of diamond particles and exhibiting an average particle size of about 16 μm, and a third amount of diamond particles of about 15 weight % of the mixture of diamond particles and exhibiting an average particle size of about 30 μm.

PDCs formed according to working example 22 were leached and VTL tested in the same manner as standard working example 18. The average center leach depth was about 320 μm. The DVR measured after 250 passes was about 35 μinch·inch2. Working example 22 unexpectedly demonstrated one-third less DVR than standard working example 18 and demonstrated a higher average abrasion resistance than all of the other working examples 18-21.

PCD bodies formed according to working example 22, with the exception of remaining unleached, were separated from their respective substrates and tested for magnetic properties in the same manner as standard working example 18.

Table II below lists the measured magnetic properties of PCD tables that were fabricated in accordance with working example 22, but were not leached prior to testing.

TABLE II

| Diamond Mix: 15 weight % (30 μm) 59 weight % (16 μm) 26 weight % (2 μm) | | | | | |
|---|---|---|---|---|---|
| No. | Coercivity (Oe) | Weight (g) | Specific Magnetic Saturation (G · cm³/g) | Specific Permeability (G · cm³/g · Oe) | Weight % of Cobalt |
| 1 | 150.8 | 1.393 | 12.31 | 0.0816313 | 6.126 |
| 2 | 152.9 | 1.395 | 11.94 | 0.078090255 | 5.941 |
| 3 | 154.4 | 1.349 | 11.89 | 0.077007772 | 5.918 |
| 4 | 155.6 | 1.311 | 11.81 | 0.075899743 | 5.88 |
| 5 | 154.1 | 1.361 | 11.95 | 0.077547047 | 5.947 |
| 6 | 153.8 | 1.375 | 11.97 | 0.077828349 | 5.959 |
| 7 | 160.1 | 1.362 | 11.68 | 0.072954403 | 5.813 |
| 8 | 155.1 | 1.409 | 11.69 | 0.075370729 | 5.818 |
| 9 | 154.1 | 1.373 | 12.01 | 0.077936405 | 5.979 |

Table II below lists the measured magnetic properties of PCD tables that were fabricated in accordance with working example 22, but were not leached prior to testing. As demonstrated in Table II, the tested samples of working example 22 exhibited an average coercivity of about 154.5 Oe, with individual samples exhibiting a measured coercivity ranging from about 150.8 Oe to about 160.1 Oe. The tested samples of working example 22 exhibited an average specific magnetic saturation of about 11.9 G·cm3/g, with individual samples exhibiting a measured specific magnetic saturation ranging from about 11.6 G·cm3/g to about 12.3 G·cm3/g. The tested samples of working example 22 exhibited an average specific permeability of about 0.077 G·cm3/g·Oe, with individual samples exhibiting a measured specific permeability ranging from about 0.073 G·cm3/g·Oe to about 0.082 G·cm3/g·Oe. The average percentage of metal-solvent catalyst (i.e., cobalt) in the PCD tables of working example 22 was about 5.93 weight %, with individual samples ranging from about 5.81 weight % to about 6.12 weight %.

Comparison of Test Results

The wear resistance graph of FIG. 7A showed that working examples 19-21 exhibited relatively lower wear or abrasion resistance (but still acceptable) than standard working example 18, while working example 22 unexpectedly exhibited exemplary wear resistance compared to all of the other working examples 18-21. Unexpectedly, working example 22 leached to a similar depth as working example 18 under the same leaching process parameters despite having a larger proportion of the 2 μm average particle size diamond particles therein (standard working example 18 only included about 5 weight % 2 μm particles while working example 22 included about 26 weight % 2 μm particles). Further, while leaching at a similar rate as standard working example 18, working example 22 demonstrated far superior wear resistance. Working examples 19-21 provided relatively similar or deeper average center leach depths, while demonstrating reduced wear resistance.

Leach depth testing was also performed on PDCs of working examples 18-22. The results of the leach depth testing are shown in FIG. 7B. The leach depth was evaluated by leaching each of the PDCs in a hydrofluoric acid solution for about 144 hours. The resulting leached PDCs were then analyzed to determine a center leach depth for each of the samples of each cutter type tested. Working examples 20 and 21 exhibited the highest average center leach depth, while working example 19 exhibited a similar average leach depth to standard working example 18. Working example 22 demonstrated slightly lower, but similar average center leach depth to standard working example 18—within about 40 μm of the center leach depth of standard working example 18.

It was thought that the increased proportion of smaller average diamond particles in working example 22 would result in a different (e.g., much smaller) average center leach depth (standard working example 18 only included about 5 weight % of 2 μm particles while working example 22 included about 26 weight % of 2 μm particles). However, working example 22 unexpectedly leached to about the same depth, and analogously, would leach at roughly the same rate as standard working example 18. Working examples 20 and 21 exhibited an acceptable balance of leachability and abrasion resistance, while example 19 exhibited the lowest average abrasion resistance coupled with higher average leachability than standard working example 22. As demonstrated in FIG. 7A, in wet VTL testing (to 250 passes), working example 19 had more than double the wear of standard working example 18, while working examples 20 and 21 exhibited more wear (i.e., about 50% more wear) than standard working example 18. Working example 22 exhibited less than half of the wear (close to only ⅓ of the wear) of standard working example 18.

As noted above, the inventors expected that as the weight % of the smaller diamond particles in a PCD increased, the wear resistance (as measured by wet VTL) would increase and that the leaching depth would decrease. As FIGS. 7A and 7B demonstrate, working example 22 demonstrated greater average wear resistance than standard working example 18 and unexpectedly leached nearly as deep (under the same leaching process parameters) as standard working example 18—about 321 μm compared to about 361 μm—despite the fact that the PCD table of working example 22 contains a larger proportion of the smaller diamond particles than the PCD table of working example 18. Moreover, the PCD tables of working examples 20 and 21 had larger average center leach depth values than standard working example 18—558 and 411 μm respectively, compared to 361 μm. For example, working example 20 includes about 30% of 2 μm diamond particles, about 22 weight % of 16 μm diamond particles, about 26 weight % of 30 μm diamond particles, and about 22% of 65 μm diamond particles. Further, notwithstanding that working example 20 contains more of the smaller average particle size (e.g., about 30 weight % of about 2 μm diamond particles) compared to standard working example 18 (e.g., about 5 weight % of about 2 μm diamond particles and about 95 weight % of about 30 μm diamond particles), FIG. 7B demonstrates that working example 20 demonstrates superior leachability to standard working example 18, and that working example 22 unexpectedly demonstrates comparable average leachability to standard working example 18.

Figure 7C:
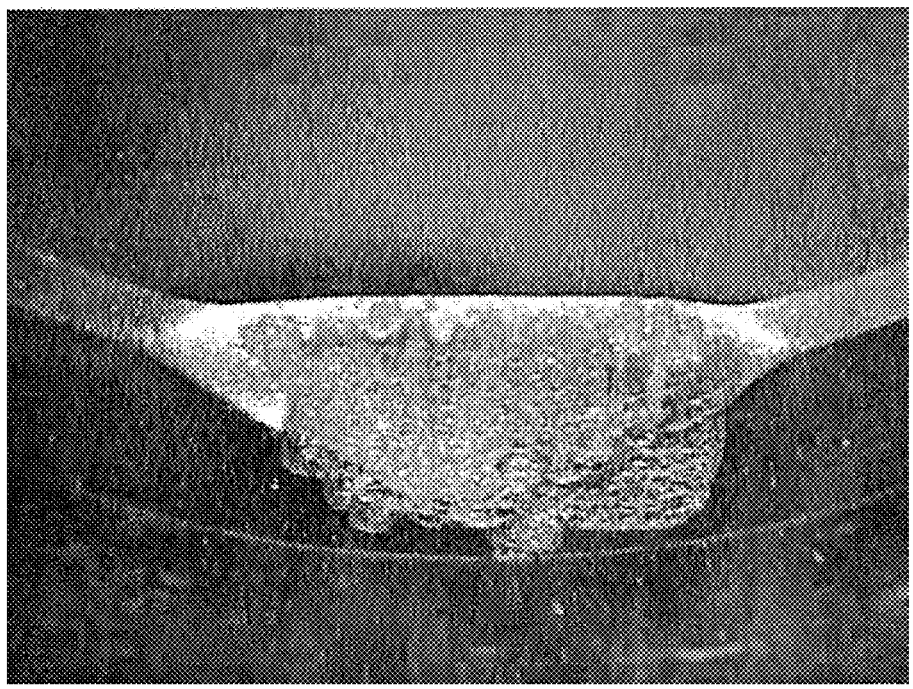
FIG. 7C is a photograph of a wear flat on a cutting surface of standard working example 18 after VTL testing.
Figure 7D:
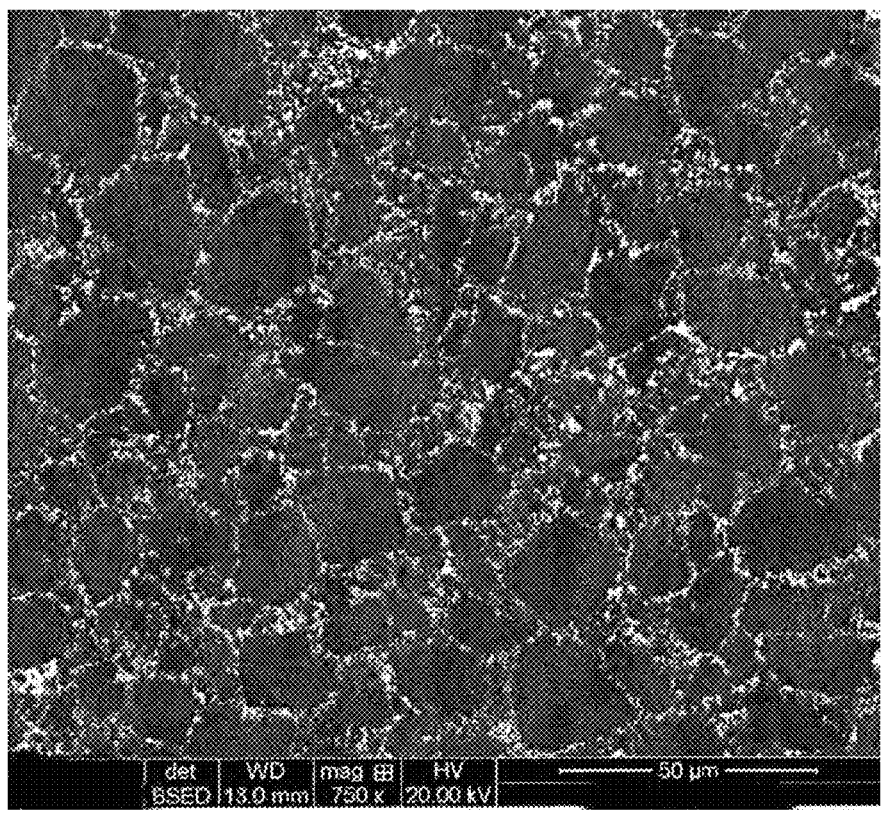
FIG. 7D is a photomicrograph of the PCD table of standard working example 18.
Figure 7E:
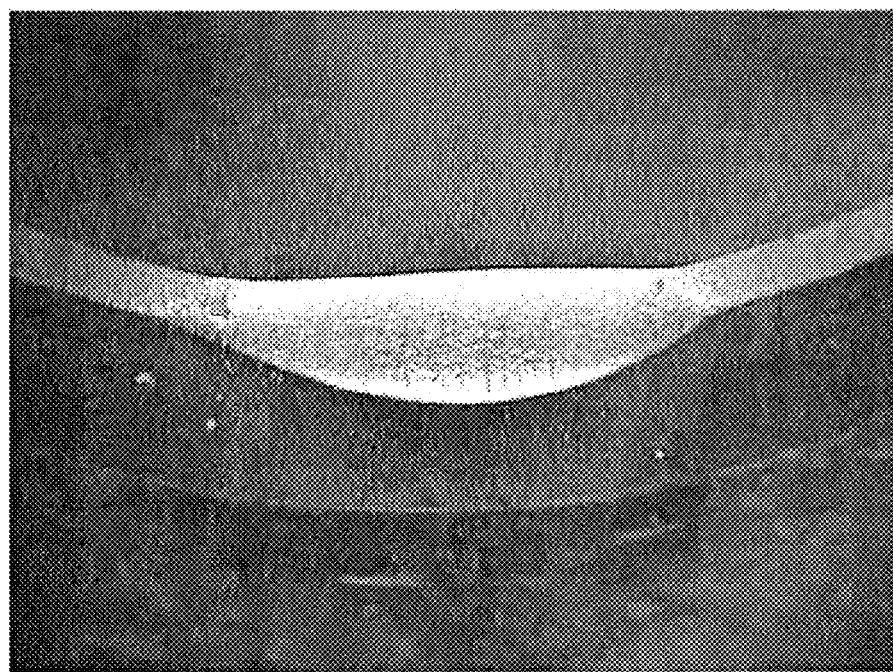
FIG. 7E is a photograph of a wear flat on a cutting surface of working example 22 after VTL testing.

FIGS. 7C and 7E are photographs of wear flats on PDCs according to standard working example 18 and working example 22 respectively, after wet VTL testing. As depicted, standard working example 18 demonstrated substantially more wear after VTL testing than working example 22.

As demonstrated in Tables I and II, the PCD tables formed according to standard working example 18 had a lower average coercivity of about 132.8 Oe than PCDs formed according to working example 22 which demonstrated an average coercivity of about 154.5 Oe. Thus, working example 22, having a larger percentage of smaller diamond particles as described herein, demonstrated a higher average coercivity indicative of more diamond-to-diamond bonding than standard working example 18 despite standard working example 18 having a larger average weight % of cobalt material therein and a larger average magnetic saturation. Standard working example 18 and working example 22 exhibited comparable averages specific permeability values, about 0.0786 G·cm3/g·Oe and about 0.0771 G·cm3/g·Oe respectively, with working example 22 having a slightly lower specific permeability.

Working example 22 exhibited, a lower leach depth (321 μm), a higher average specific magnetic saturation (11.91 G·cm3/g), a higher average weight % of cobalt (5.91 weight %), and yet still exhibited a higher average coercivity (154.5 Oe) and a much higher wear resistance (35 μinch·inch2 removed on wet VTL after 250 passes) than standard working example 18.

Figure 7F:
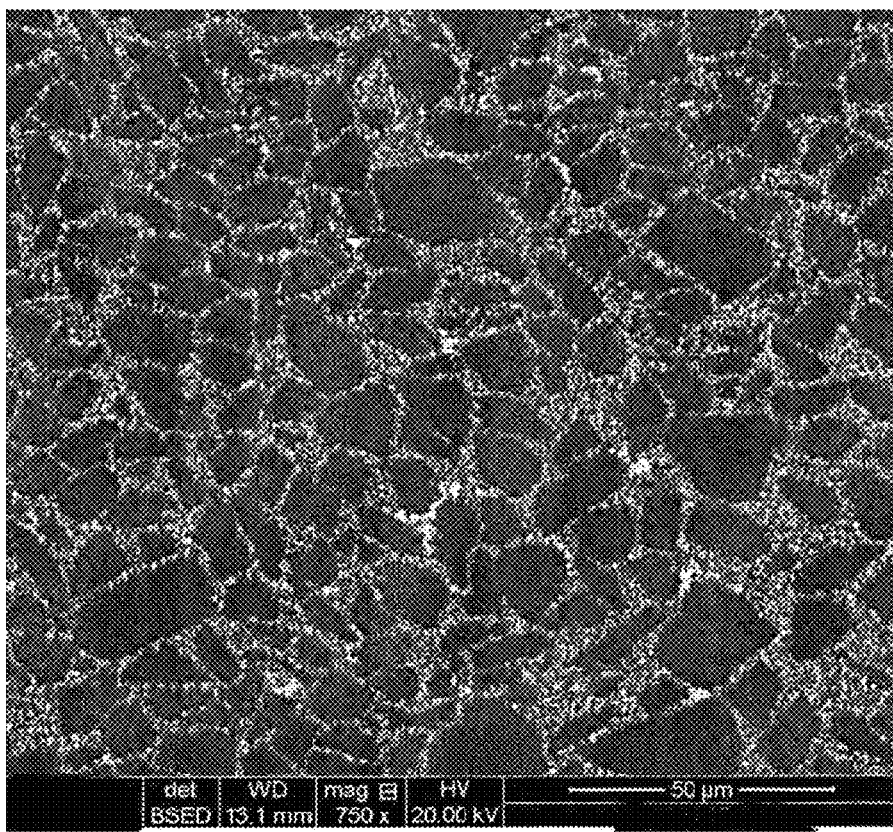
FIG. 7F is a photomicrograph of the PCD table of working example 22.

FIGS. 7D and 7F are micrographs of PCD tables formed according to working examples 18 and 22, respectively. FIG. 7D is a scanning electron micrograph of a portion of cross section of a PCD table formed according to standard working example 18 at 750× magnification. FIG. 7D is a scanning electron micrograph of a portion of cross section of a PCD table formed according to working example 22 at 750× magnification. As explained above, standard working example 18 includes about 5 weight % of diamond particles exhibiting about 2 μm average diamond particle size and 95 weight % of diamond particles exhibiting about 16 μm average diamond particle size; and working example 22 includes about 26 weight % of diamond particles exhibiting an average diamond particle size of about 2 μm, about 59 weight % of diamond particles exhibiting an average diamond particle size of about 16 μm, and 15 weight % of diamond particles exhibiting an average diamond particle size of about 30 μm. The micrographs depict a plurality of larger diamond particles (e.g., average diamond particles size of about 16 μm and/or 30 μm) having interstitial spaces therebetween including a plurality of smaller diamond particles (e.g., average diamond particle size of about 2 μm). The smaller diamond particles substantially fill the interstitial spaces between the larger diamond particles resulting in a densely packed PCD table. As depicted in FIGS. 7D and 7F, the resulting PCD table may also include a catalyst material (e.g., cobalt) in the interstitial spaces between diamond particles. The catalyst material may be removed from the PCD table according to any of the techniques described above. The resulting leached PCD table may exhibit porosity between the pluralities of diamond particles therein. Porosity of PCD tables may be measured using porosimetry techniques, such as any of those described in U.S. Provisional Patent Application No. 61/846,138 filed Jul. 15, 2013 and/or U.S. patent application Ser. No. 14/329,552 filed Jul. 11, 2014, each of which is incorporated herein, in its entirety, by this reference. For example, mercury porosimetry measurements may be performed on a sample PCD table in its leached or unleached condition to measure porosity and other characteristics.

The disclosed PDC embodiments may be used in a number of different applications including, but not limited to, use in a rotary drill bit (FIGS. 8A and 8B), a thrust-bearing apparatus (FIG. 9), a radial bearing apparatus (FIG. 10), a mining rotary drill bit, and a wire-drawing die. The various applications discussed above are merely some examples of applications in which the PDC embodiments may be used. Other applications are contemplated, such as employing the disclosed PDC embodiments in friction stir welding tools.

Figure 8A:
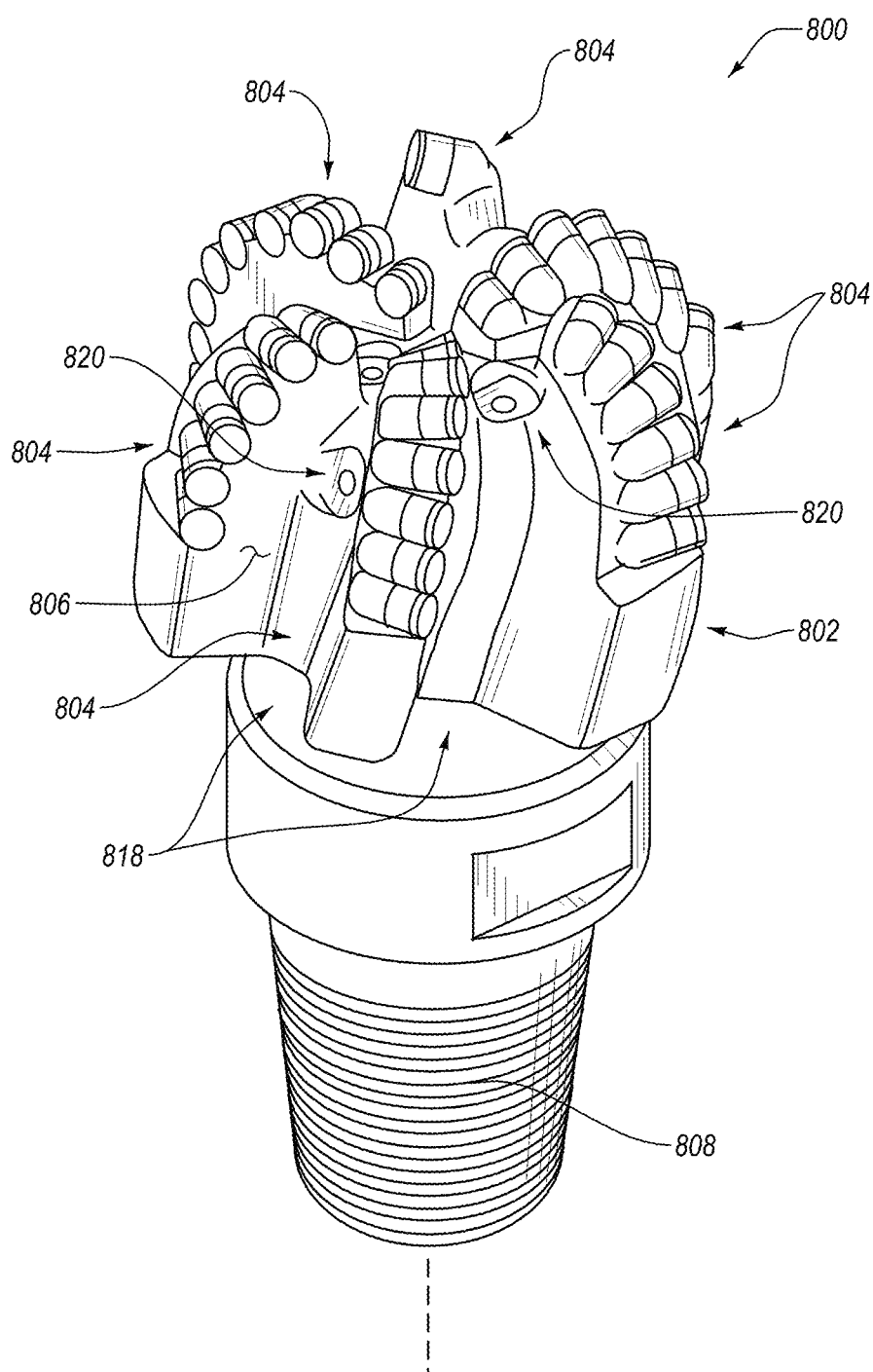
FIG. 8A is an isometric view of an embodiment of a rotary drill bit that may employ one or more of the disclosed PDC embodiments.
Figure 8B:
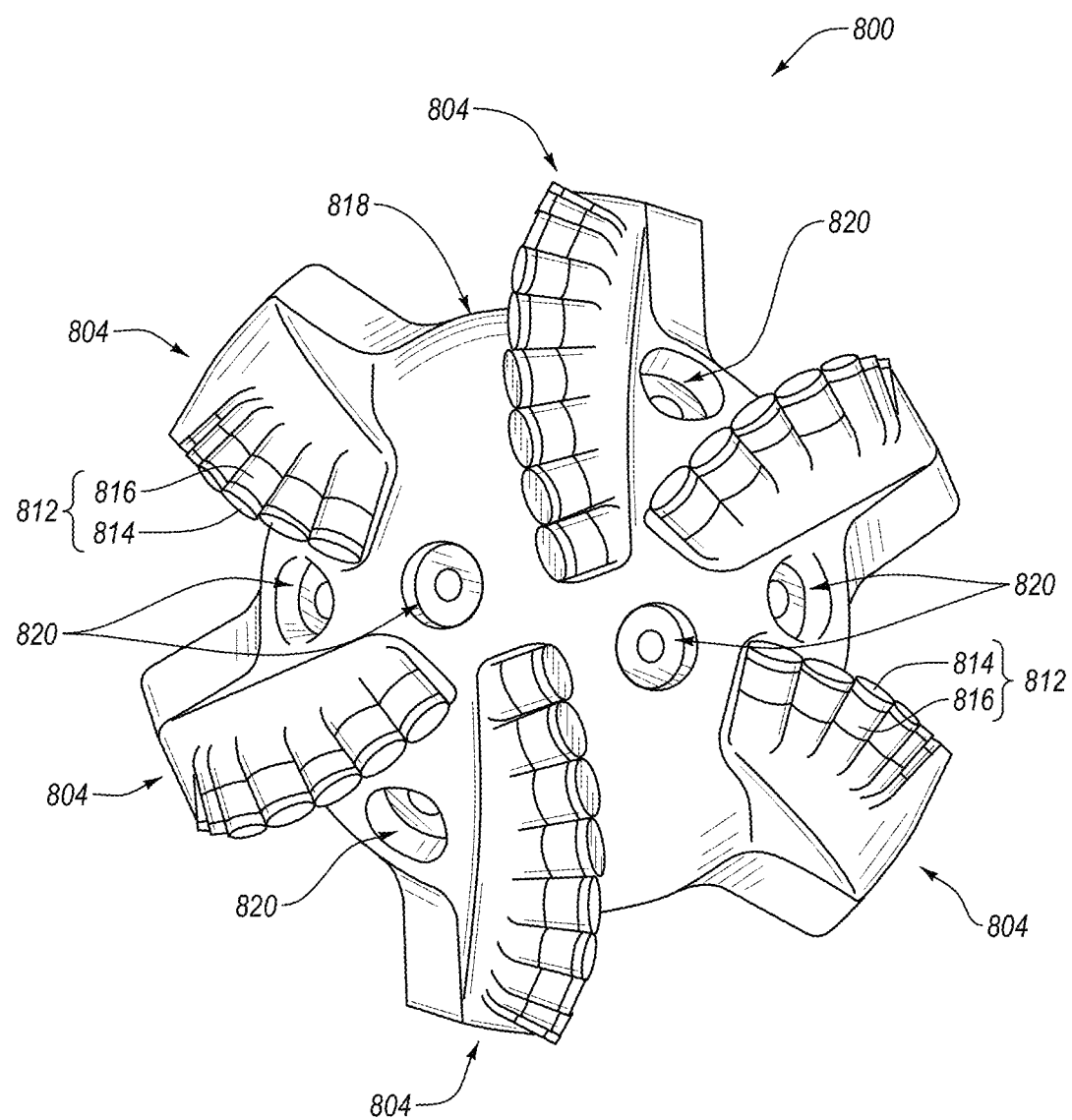
FIG. 8B is a top elevation view of the rotary drill bit shown in FIG. 8A.

FIG. 8A is an isometric view and FIG. 8B is a top elevation view of an embodiment of a rotary drill bit 800 for use in subterranean drilling applications, such as oil and gas exploration. The rotary drill bit 800 includes at least one PCD element and/or PDC configured according to any of the previously described PDC embodiments. The rotary drill bit 800 comprises a bit body 802 that includes radially and longitudinally extending blades 804 with leading faces 806, and a threaded pin connection 808 for connecting the bit body 802 to a drilling string. The bit body 802 defines a leading end structure for drilling into a subterranean formation by rotation about a longitudinal axis and application of weight-on-bit. At least one PDC cutting element, configured according to any of the previously described PDC embodiments (e.g., the PDC 100 shown in FIG. 1A) may be affixed to the bit body 802. With reference to FIG. 8B, a plurality of PDCs 812 are secured to the blades 804. For example, each PDC 812 may include a PCD table 814 bonded to a substrate 816. More generally, the PDCs 812 may comprise any PDC disclosed herein, without limitation. In addition, if desired, in some embodiments, a number of the PDCs 812 may be conventional in construction. Also, circumferentially adjacent blades 804 define so-called junk slots 818 therebetween, as known in the art. Additionally, the rotary drill bit 800 may include a plurality of nozzle cavities 820 for communicating drilling fluid from the interior of the rotary drill bit 800 to the PDCs 812.

Figure 9:
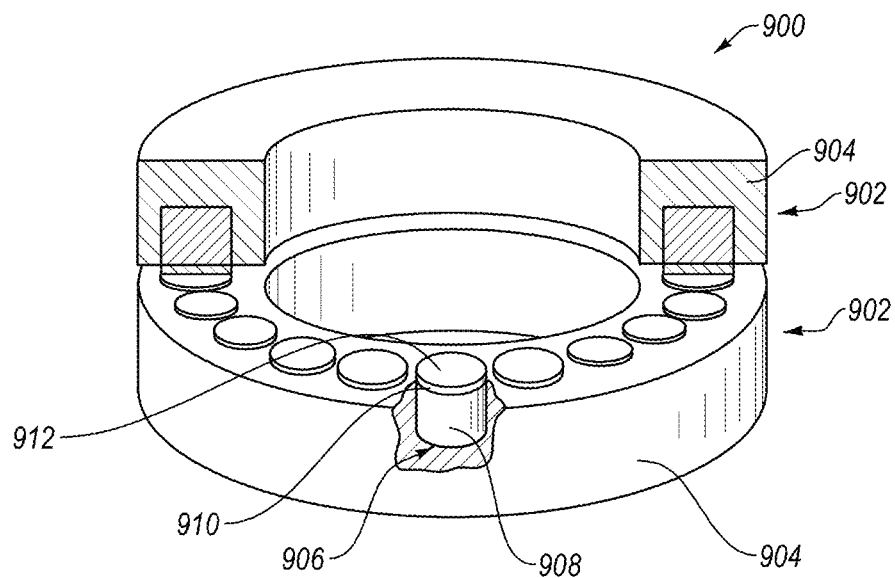
FIG. 9 is an isometric cut-away view of an embodiment of a thrust-bearing apparatus that may utilize one or more of the disclosed PDC embodiments.

FIG. 9 is an isometric cut-away view of an embodiment of a thrust-bearing apparatus 900, which may utilize any of the disclosed PDC embodiments as bearing elements. The thrust-bearing apparatus 900 includes respective thrust-bearing assemblies 902. Each thrust-bearing assembly 902 includes an annular support ring 904 that may be fabricated from a material, such as carbon steel, stainless steel, or another suitable material. Each support ring 904 includes a plurality of recesses (not labeled) that receives a corresponding bearing element 906. Each bearing element 906 may be mounted to a corresponding support ring 904 within a corresponding recess by brazing, press-fitting, using fasteners, or another suitable mounting technique. One or more, or all of bearing elements 906 may be configured according to any of the disclosed PDC embodiments. For example, each bearing element 906 may include a substrate 908 and a PCD table 910, with the PCD table 910 including a bearing surface 912.

In use, the bearing surfaces 912 of one of the thrust-bearing assemblies 902 bears against the opposing bearing surfaces 912 of the other one of the thrust-bearing assemblies 902. For example, one of the thrust-bearing assemblies 902 may be operably coupled to a shaft to rotate therewith and may be termed a "rotor." The other one of the thrust-bearing assemblies 902 may be held stationary and may be termed a "stator."

Figure 10:
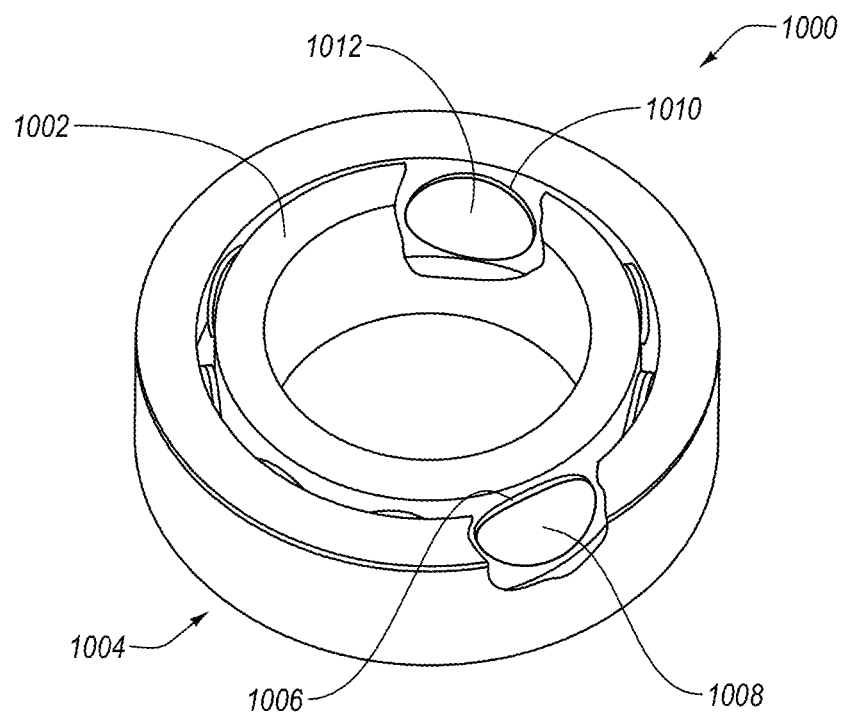
FIG. 10 is an isometric cut-away view of an embodiment of a radial bearing apparatus that may utilize one or more of the disclosed PDC embodiments.

FIG. 10 is an isometric cut-away view of an embodiment of a radial bearing apparatus 1000, which may utilize any of the disclosed PDC embodiments as bearing elements. The radial bearing apparatus 1000 includes an inner race 1002 positioned generally within an outer race 1004. The outer race 1004 includes a plurality of bearing elements 1010 affixed thereto that have respective bearing surfaces 1012. The inner race 1002 also includes a plurality of bearing elements 1006 affixed thereto that have respective bearing surfaces 1008. One or more, or all of the bearing elements 1006 and 1010 may be configured according to any of the PDC embodiments disclosed herein. The inner race 1002 is positioned generally within the outer race 1004 and, thus, the inner race 1002 and outer race 1004 may be configured so that the bearing surfaces 1008 and 1012 may at least partially contact one another and move relative to each other as the inner race 1002 and outer race 1004 rotate relative to each other during use.

The radial-bearing apparatus 1000 may be employed in a variety of mechanical applications. For example, so-called "roller cone" rotary drill bits may benefit from a radial-bearing apparatus disclosed herein. More specifically, the inner race 1002 may be mounted to a spindle of a roller cone and the outer race 1004 may be mounted to an inner bore formed within a cone and that such an outer race 1004 and inner race 1002 may be assembled to form a radial-bearing apparatus.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of fabricating a polycrystalline diamond compact, comprising:
   mixing a plurality of diamond particles having at least a trimodal distribution including a first amount being about 5 weight % to about 65 weight % of the plurality of diamond particles that exhibits a first average particle size of about 0.5 µm to about 30 µm, a second amount being about 18 weight % to about 65 weight % of the plurality of diamond particles that exhibits a second average particle size that is greater than the first average particle size and is about 10 µm to about 65 µm, and a third amount comprising about 5 weight % to about 35 weight % of the plurality of diamond particles that exhibits a third average particle size of about 20 µm to about 45 µm;
   enclosing the plurality of diamond particles in a pressure transmitting medium to form a cell assembly; and
   subjecting the cell assembly to a high-pressure/high-temperature process to form a polycrystalline diamond body.

2. The method of claim 1, wherein the first amount is about 15 weight % to about 45 weight %.

3. The method of claim 2, wherein the first average particle size is about 0.5 µm to about 14 µm and the second average particle size is about 15 µm to about 24 µm.

4. The method of claim 3, wherein the first amount is about 38 weight % to about 42 weight %, the first average particle size is about 12 µm, the second amount is about 58 weight % to about 62 weight %, and the second average particle size is about 20 µm.

5. The method of claim 1, wherein the first average particle size is about 0.5 µm to about 5 µm and the second average particle size is about 14 µm to about 18 µm.

6. The method of claim 1, wherein the first amount is about 20 weight % to about 45 weight %, the second amount is about 55 weight % to about 65 weight %, the first average particle size is about 0.5 µm to about 5 µm, and the second average particle size is about 12 µm to about 30 µm.

7. The method of claim 6, wherein the first amount is about 20 weight % to about 30 weight % and the second average particle size is about 15 µm to about 20 µm.

8. The method of claim 7, wherein the first average particle size is about 0.5 µm to about 5 µm and the second average particle size is about 14 µm to about 18 µm.

9. The method of claim 1, wherein the first amount is about 35 weight % to about 45 weight %, second amount is about 55 weight % to about 65 weight %, the first average particle size is about 0.5 µm to about 5 µm, and the second average particle size is about 30 µm to about 32 µm.

10. The method of claim 6, wherein the first average particle size is about 2 μm and the second average particle size is about 16 μm.

11. The method of claim 1, wherein the first amount is greater than about 20 weight % and less than about 65 weight %, the first average particle size is about 0.5 μm to about 5 μm, and the second average particle size is about 12 μm to about 30 μm.

12. The method of claim 1, wherein the first amount is about 25 weight % to about 40 weight %, the first average particle size is about 0.5 μm to about 14 μm, and the second average particle size is about 16 μm to about 30 μm.

13. The method of claim 1, wherein the first amount is about 35 weight % to about 45 weight %, the second amount is about 55 weight % to about 65 weight %, the first average particle size is about 10 μm to about 14 μm, and the second average particle size is about 18 μm to about 22 μm.

14. The method of claim 1, wherein the third average particle size is greater than the first average particle size and the second average particle size.

15. The method of claim 1, wherein the third amount is about 10 weight % to about 20 weight % of the plurality of diamond particles.

16. The method of claim 1, wherein the third average particle size is about 27 μm to about 33 μm.

17. A method of fabricating a polycrystalline diamond compact, comprising:
mixing a plurality of diamond particles having at least a trimodal distribution including a first amount being about 20 weight % to about 30 weight % of the plurality of diamond particles that exhibits a first average particle size of about 0.5 μm to about 3 μm and a second amount being about 55 weight % to about 65 weight % of the plurality of diamond particles that exhibits a second average particle size that is greater than the first average particle size and is about 14 μm to about 18 μm;
enclosing the plurality of diamond particles in a pressure transmitting medium to form a cell assembly; and
subjecting the cell assembly to a high-pressure/high-temperature process to form a polycrystalline diamond body,
wherein the plurality of diamond particles further includes a third amount of about 5 weight % to about 35 weight % of the plurality of diamond particles that exhibits a third average particle size that is greater than the first average particle size and the second average particle size, and
wherein the third average particle size is about 27 μm to about 33 μm.

18. The method of claim 17, wherein the first amount is about 26 weight %, the third amount is about 15 weight %, the first average particle size is about 2 μm, the second average particle size is about 16 μm, and the third average particle size is about 30 μm.

19. The method of claim 1, further comprising mixing boron with the plurality of diamond particles in an amount greater than 0 weight % to about 5 weight %.

20. The method of claim 1, wherein:
the cell assembly includes a substrate positioned at least proximate to the plurality of diamond particles; and
subjecting the cell assembly to a high-pressure/high-temperature process to form a polycrystalline diamond body includes forming the polycrystalline diamond body as a table bonded to the substrate.

* * * * *